United States Patent
Gu et al.

(10) Patent No.: US 9,323,997 B2
(45) Date of Patent: Apr. 26, 2016

(54) DISTORTION/QUALITY MEASUREMENT

(75) Inventors: Xiaodong Gu, Beijing (CN); Kai Xie, Beijing (CN); Zhibo Chen, Beijing (CN)

(73) Assignee: Thomson Licensing, Issy les-Moulineux (FR)

( * ) Notice: Subject to any disclaimer, the term of this patent is extended or adjusted under 35 U.S.C. 154(b) by 0 days.

(21) Appl. No.: 14/358,304

(22) PCT Filed: Nov. 28, 2011

(86) PCT No.: PCT/CN2011/083076
§ 371 (c)(1),
(2), (4) Date: May 15, 2014

(87) PCT Pub. No.: WO2013/078599
PCT Pub. Date: Jun. 6, 2013

(65) Prior Publication Data
US 2014/0314321 A1   Oct. 23, 2014

(51) Int. Cl.
*G06K 9/03*   (2006.01)
*H04N 17/00*   (2006.01)

(52) U.S. Cl.
CPC .............. *G06K 9/036* (2013.01); *H04N 17/004* (2013.01)

(58) Field of Classification Search
None
See application file for complete search history.

(56) References Cited

U.S. PATENT DOCUMENTS

| | | | |
|---|---|---|---|
| 8,811,495 B1 * | 8/2014 | Wen | 375/240.25 |
| 2004/0012675 A1 | 1/2004 | Caviedes | |
| 2007/0237227 A1 | 10/2007 | Yang et al. | |
| 2010/0091841 A1 * | 4/2010 | Ishtiaq et al. | 375/240.02 |
| 2010/0278275 A1 | 11/2010 | Yang et al. | |
| 2012/0020415 A1 | 1/2012 | Yang et al. | |

FOREIGN PATENT DOCUMENTS

| | | |
|---|---|---|
| CN | 1669338 A | 9/2005 |
| CN | 101595736 A | 12/2009 |
| CN | 101911716 A | 12/2010 |
| JP | 200866856 | 3/2008 |
| WO | WO2010093745 A1 | 8/2010 |

OTHER PUBLICATIONS

Ma et al. "A User Attention Model for Video Summarization". In Proceedings of the ACM International Conference on Multimedia. New York, NY, USA 2002. pp. 533-542.

(Continued)

*Primary Examiner* — David F Dunphy
(74) *Attorney, Agent, or Firm* — Robert D. Shedd; Paul P. Kiel; Xiaoan Lu

(57) ABSTRACT

Various implementations address distortion and quality measurements related to, for example, freeze-with-skip and/or a freeze-without-skip events. In several implementations, information is accessed indicating that a first and second set of one or more consecutive pictures are not to be displayed. A first and second indicator are determined. In one such implementation, the first and second indicators indicate an amount of distortion across one or more types of distortive effects that result from displaying substantially a first, or second, same picture during a display time for the first, or second, set of pictures. The first and second indicators are combined in a non-linear manner. In another such implementation, the distortion is associated with a given type of distortive effect, from among multiple types of distortive effects, and the first and second indicators are combined for the given type of distortive effect.

20 Claims, 7 Drawing Sheets

(56) References Cited

OTHER PUBLICATIONS

Search Report Dated: Aug. 10, 2012.
Yang et al.: "Video quality management for mobile video application," Proceedings of SPIE, vol. 7798, Aug. 19, 2010, pp. 77981I-1 to 77981I-12.
Yang et al.: "Perceptual Temporal Quality Metric for Compressed Video," IEEE Transactions on Multimedia, IEEE, US, vol. 9, No. 7, Nov. 1, 2007, pp. 1528-1535.
Pastrana-Vidal et al.: "Automatic Quality Assessment of Video Fluidity Impairments Using a No-Reference Metric", In Proc. of int. workshop on video processing and quality metrics for consumer electronics, 2006.

\* cited by examiner

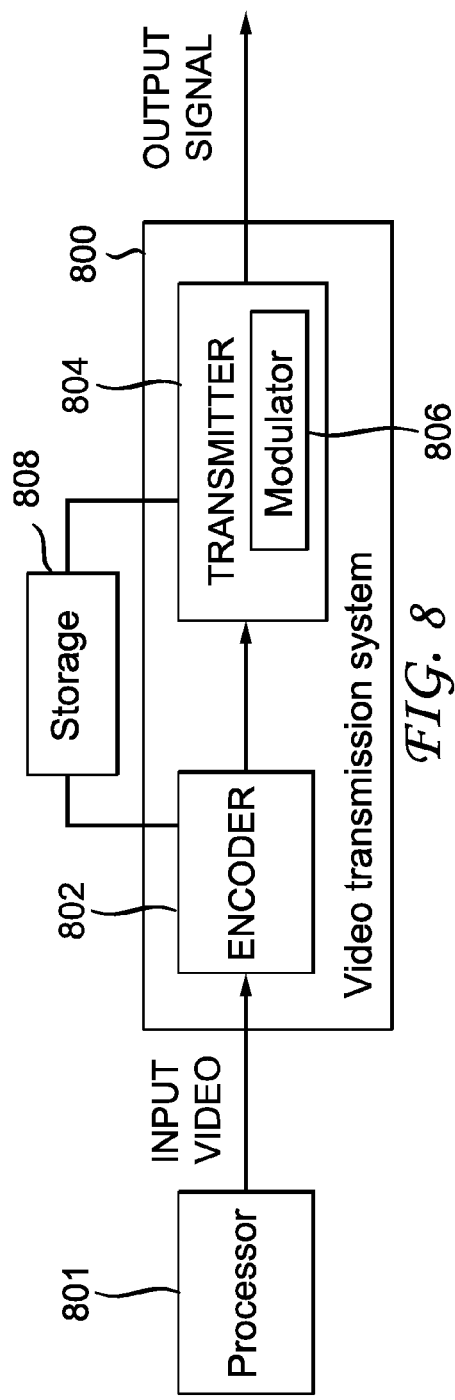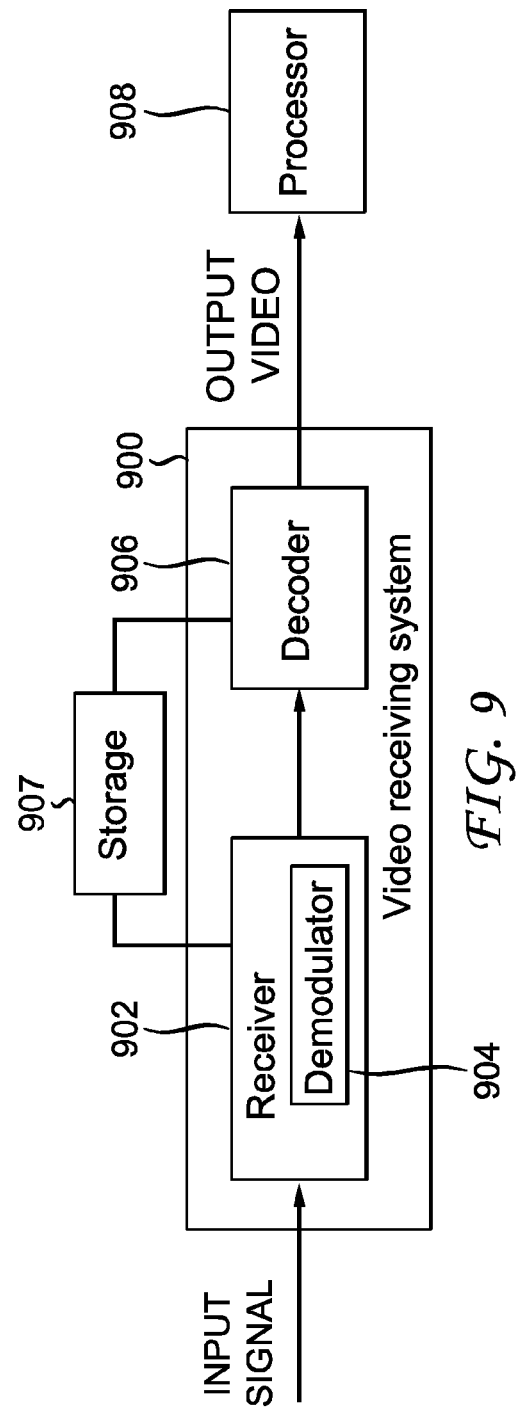

DISTORTION/QUALITY MEASUREMENT

This application claims the benefit, under 35 U.S.C. §365 of International Application PCT/CN2011/083076, filed Nov. 28, 2011, which was published in accordance with PCT Article 21(2) on Jun. 6, 2013 in English.

TECHNICAL FIELD

Implementations are described that relate to video. Various particular implementations relate to determining distortion and/or quality for video.

BACKGROUND

Video quality is affected by various distortions. Certain distortions include, for example, (i) compression artifacts, (ii) channel artifacts, (iii) freezing of a picture, and (iv) skipping of a picture. The impact of the distortion on the perceived video quality may vary depending on the type of distortion.

SUMMARY

According to a general aspect, information is accessed indicating that a first set of one or more consecutive pictures from a video sequence are not to be displayed. Information is accessed indicating that a second set of one or more consecutive pictures from the video sequence are not to be displayed. The second set is separate from the first set in the video sequence. A first indicator is determined. The first indicator indicates an amount of distortion associated with a given type of distortive effect, from among multiple types of distortive effects, that results from displaying the video sequence with substantially a common first picture displayed during a display time for the first set of pictures. A second indicator is determined. The second indicator indicates an amount of distortion associated with the given type of distortive effect that results from displaying the video sequence with substantially a common second picture displayed during a display time for the second set of pictures. The first indicator and the second indicator are combined to produce a combined indicator of distortion for the given type of distortive effect.

According to another general aspect, information is accessed indicating that a first set of one or more consecutive pictures from a video sequence are not to be displayed. Information is accessed indicating that a second set of one or more consecutive pictures from the video sequence are not to be displayed. The second set is separate from the first set in the video sequence. A first indicator is determined. The first indicator indicates an amount of distortion across one or more types of distortive effects that result from displaying the video sequence with substantially a common first picture displayed during a display time for the first set of pictures. A second indicator is determined. The second indicator indicates an amount of distortion across the one or more types of distortive effects that result from displaying the video sequence with substantially a common second picture displayed during a display time for the second set of pictures. The first indicator and the second indicator are combined in a non-linear manner to produce a combined indicator of distortion.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

BRIEF DESCRIPTION OF THE DRAWINGS

FIG. 8 is a block/flow diagram depicting an implementation of a transmission system and process.

FIG. 9 is a block/flow diagram depicting an example of a receiving system and process.

DETAILED DESCRIPTION

Figure 1:
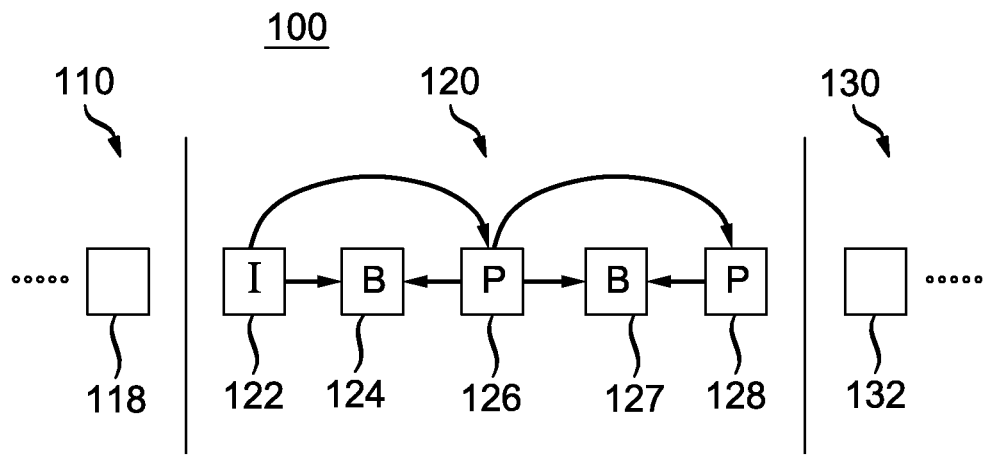
FIG. 1 is a pictorial representation of a first example of a sequence of pictures.

As a preview of some of the features presented in this application, at least one implementation detects impairments in a video sequence caused by freezing. Such impairments are often referred to as temporal impairments. Additionally, at least one of these implementations evaluates the impairment using bit-stream layer information rather than pixel layer information. Further, the evaluation provides an estimate of the distortion caused by the impairment, and the resulting quality. One particular implementation separately pools each type of distortive effect, even though several types of distortive effects are typically present in a given freezing event. Another implementation pools the distortion for a common distortive effect, across separate freezing events, in a non-linear manner. These and other implementations are described below.

Video quality can be impacted by a variety of distortions. Such distortions may include, for example, one or more of the following:

Compression artifacts, which are caused, for example, by a lossy coder-decoder ("codec").

Channel artifacts, caused by packet loss: Packet loss is detected at the transport layer and decoder error concealment post-processor tries to mitigate the effect of lost packets. Such error concealment is performed, for example, at a block level. The distortions generated in error concealment (for example, in a post-processor), and the propagation of the error concealment distortions from the current picture to pictures that are decoded after the current picture, are called channel artifacts.

Freezing with skip, also caused by packet loss: "Freezing" refers to a pause in the display of a video sequence, during which a current picture is displayed for more than a single picture display time. The difference between the distortion referred to as "freezing with skip" and the distortion referred to as a "channel artifact" is that, in certain implementations, the whole picture is dropped when a packet of the picture is lost. An additional difference in various implementations is that when an entire picture is dropped, and therefore skipped, the pictures that depend on the dropped picture as a prediction reference are also dropped. When one or more pictures are dropped, the current picture is "frozen" in the display for a time duration that corresponds to the current picture display time and the display time of the dropped pictures. A viewer that sees a "frozen" display typically perceives this as a distortion. Additionally, because the dropped pictures are not displayed at all, these dropped pictures are said to be "skipped". "Skipping" typically introduces a perceptible jump or transition that a viewer perceives as a separate distortion from the "freezing", although the two distortions are related.

Freezing without skip, caused by buffer underflow: For reasons such as, for example, network delay, there may not be a decoded picture in the buffer when a display asks for a picture to show. The display then pauses until the next decoded picture arrives in the buffer. This kind of distortion is called "freezing without skip" because no picture is skipped.

The impact of these, and other, distortions can be evaluated at both a bit-stream layer and a pixel layer. In various bit-stream layer methods, the evaluation scheme is based on the parser of the bit-stream and the pixel value is not decoded. In various pixel layer methods, full decoding of the bit-stream is acceptable. Clearly, at the pixel layer, additional information is available for evaluating the distortion. However, additional computation, and time, are typically required to get the pixel layer information.

Accordingly, at least one implementation in this application provides a technique for evaluating quality at a bit-stream layer when video is distorted by one or more "freezing" (with or without skip) distortions. Further, one or more implementations detect an occurrence of one or more "freezing" distortions, and provide a measure of the resulting distortion and quality of the video.

Note that a "freezing" distortion may also, or alternatively, typically be considered to be two or more distortions. The first occurrence of distortion is typically a jerk (or a stop) in the motion when the "freezing" begins. The second occurrence of distortion is typically the pause created by the "freezing". A third occurrence of distortion, for "freezing with skip", is typically the "jump" (also referred to as the "skip") in the motion that occurs after the "freeze" ends and the "skip" occurs.

Various implementations determine the impact on a viewer of, for example, a given "freezing" event (or of a component of the event, such as the "freeze" or the "skip"), or of multiple "freezing" events (or components from multiple events). The impact is often described as a numerical value, and is typically referred to as "distortion" (or as "quality"). The determined distortion, however, in various implementations is not complete. That is, in various implementations, the determined distortion ignores a component, or an event, and is best considered to be an approximation or an estimate.

1. Discussion of Distortion

When packet loss is detected at a transport layer, practical decoding systems typically have two choices. A first choice is to try to mitigate the effect of one or more lost packets with error concealment, performed, for example, at an error concealment post-processor. The error concealment process may perform any of a variety of error concealment techniques, which are known in the art, including, for example, copying a corresponding block from another picture. A second choice is to drop the whole picture. Channel artifacts are often generated when error concealment is selected. "Freezing with skip" effects are often generated when a picture is dropped.

One or more implementations that focus, at least in part, on "freezing with skip" effects are discussed in this application. In at least one implementation, when a packet loss occurs the whole picture is dropped, resulting in a "freezing with skip" distortion. If the dropped picture is an I-picture or a P-picture, then the dropped picture is used as a prediction reference picture for one or more additional pictures that have not yet been decoded. These additional pictures may be said to be dependent on the dropped picture, and can be referred to as dependent pictures. These dependent pictures are also dropped in at least one implementation. More specifically, for this implementation:

If a packet in an I-picture is lost, then all the pictures in a group-of-pictures ("GOP") are dropped. This is because, a typical GOP includes an I-picture which will be dropped because of the lost packet, and all the remaining pictures in the GOP depend from the I-picture either directly or indirectly.

If a packet in a P-picture is lost, the P-picture is dropped. Additionally, all pictures in the GOP that depend from the dropped P-picture are dropped. In many cases, this will correspond to the P-picture and all remaining pictures to the end of the GOP.

If a packet in a normal B-picture is lost, then only the B-picture (which contains the lost packet) is dropped. Note that normal B-pictures are not used as a reference for any other pictures.

In the above scenarios, at least one group of continuous pictures are dropped when a packet loss occurs. A group includes one or more pictures. This occurs regardless of whether the picture that contains the lost packet is an I-picture, a P-picture, or a B-picture.

Figure 2:
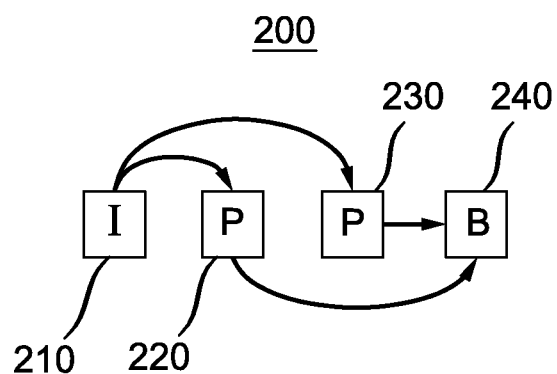
FIG. 2 is a pictorial representation of a second example of a sequence of pictures.

FIGS. 1 and 2 provide examples. Referring to FIG. 1, a sequence 100 of video pictures is shown in display order from left to right. The sequence 100 includes multiple sequential GOPs, including a GOP 110, a GOP 120, and a GOP 130. For the GOP 110, only the last picture is shown, which is a picture 118. Similarly, for the GOP 130, only the first picture is shown, which is a picture 132. However, for the GOP 120, all of the pictures in the GOP 120 are shown.

The GOP 120 includes an I-picture 122, a B-picture 124, a P-picture 126, a second B-picture 127, and a second P-picture 128. The I-picture 122 has no reference picture. The B-picture 124 depends from the I-picture 122 and the P-picture 126, as shown by the arrows going from the I-picture 122 and the P-picture 126 to the B-picture 124. The P-picture 126 depends from the I-picture 122, as shown by the arrow going from the I-picture 122 to the P-picture 126. The B-picture 127 depends from the P-picture 126 and the P-picture 128, as shown by the arrows going from the P-picture 126 and the P-picture 128 to the B-picture 127. The P-picture 128 depends from the P-picture 126, as shown by the arrow going from the P-picture 126 to the P-picture 128.

It can be seen that if one or more of the pictures in the GOP 120 is dropped, then there will be one or more consecutive group droppings, as follows. A consecutive group dropping is a set of one or more consecutive pictures that are dropped.

If the I-picture 122 is dropped, then all of the pictures in the GOP 120 will be dropped because all remaining pictures in the GOP 120 depend from the I-picture 122. This will be one consecutive group dropping that includes five pictures.

If the B-picture 124 is dropped, then only the B-picture 124 is dropped because no other picture depends from the B-picture 124. This will be one consecutive group dropping that includes only one picture.

If the P-picture 126 is dropped, then all pictures except the I-picture 122 will be dropped because all of those pictures depend from the P-picture 126. This will be one consecutive group dropping that includes four pictures.

If the B-picture 127 is dropped, then only the B-picture 127 is dropped because no other picture depends from the B-picture 127. This will be one consecutive group dropping that includes only one picture.

If the P-picture 128 is dropped, then B-picture 127 will also be dropped because the B-picture 127 depends from the P-picture 128. This will be one consecutive group dropping that includes two pictures.

Referring to FIG. 2, another example is provided. FIG. 2 shows a GOP 200 that includes an I-picture 210, a first P-picture 220, a second P-picture 230, and a B-picture 240. The I-picture 210 has no reference picture. The P-picture 220 depends from the I picture 210, as shown by the arrow going from the I-picture 210 to the P-picture 220. The P-picture 230 also depends from the I picture 210, as shown by the arrow going from the I-picture 210 to the P-picture 230. The B-picture 240 depends from the P-picture 220 and the P-picture 230, as shown by the arrows going from the P-picture 220 and the P-picture 230 to the B-picture 240.

It can be seen that if one or more of the pictures in the GOP 200 is dropped, then there will be one or more consecutive group droppings, as follows.

If the I-picture 210 is dropped, then all of the pictures in the GOP 200 will be dropped because all remaining pictures in the GOP 200 depend from the I-picture 210. This will be one consecutive group dropping that includes four pictures.

If the P-picture 220 is dropped, then the B-picture 240 will also be dropped because the B-picture 240 depends from the P-picture 220. However, the P-picture 220 and the B-picture 240 are not adjacent. Thus, this will result in two consecutive group droppings, each of which includes only one picture. The first group dropping includes the P-picture 220. The second group dropping includes the B-picture 240.

If the P-picture 230 is dropped, then the B-picture 240 will also be dropped because the B-picture 240 depends from the P-picture 230. This will be one consecutive group dropping that includes two pictures.

If the B-picture 240 is dropped, then only the B-picture 240 is dropped because no other picture depends from the B-picture 240. This will be one consecutive group dropping that includes only one picture.

We can therefore conclude that, in the scenario of "freezing with skip" a distorted video sequence contains at least one group dropping. In at least one typical "freezing with skip" implementation, every group dropping includes one or more continuous (adjacent) pictures that are dropped and replaced by the last correctly received picture in the display sequence. As a result, the viewer will typically recognize that the video freezes for some time, while the last correctly received picture remains in the display during the picture time(s) corresponding to the group dropping, and that the video recovers afterward. The total display time for the distorted video sequence is not changed, as compared with the total display time for the original (un-distorted) video sequence.

The algorithms discussed further below provide at least one implementation and solution for evaluating the impact of the "freezing" (with or without "skip") distortion. In one particular implementation, the algorithm below evaluates the overall degradation caused by "freezing with skip", and the overall quality of the distorted video.

Figure 3:
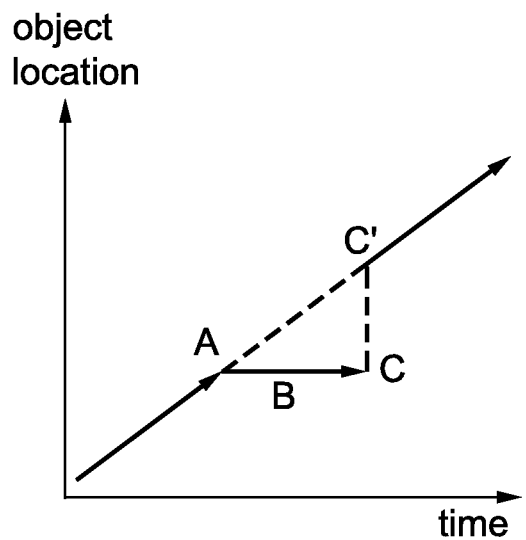
FIG. 3 is a graphical representation of an example of a freeze with skip.

FIG. 3 illustrates an example of one implementation of a movement trajectory of an object when "freezing with skip" occurs. In FIG. 3, an object's location is given by the y-axis, and time is given by the x-axis. The observed object moves smoothly until "freezing with skip" occurs at point A, where the object abruptly stops moving. The abrupt stop is depicted in FIG. 3 by the object's location remaining constant during the time of period B, which extends from the point A to the point C. During the entire period B, the object remains static (that is, the object's location does not move). Then, at point C, the object resumes motion.

Figure 4:
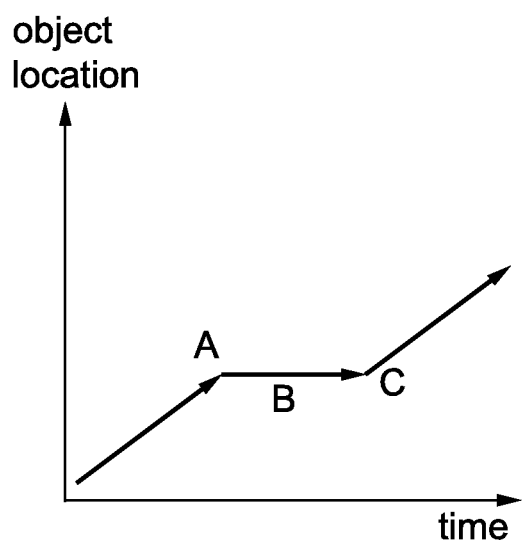
FIG. 4 is a graphical representation of an example of a freeze without skip.

FIG. 4 illustrates an example of one implementation of a movement trajectory of an object when "freezing without skip" occurs. The observed object experiences a similar initial trajectory as in the "freezing with skip" case of FIG. 3. The object moves smoothly until "freezing without skip" occurs at point A, where the object abruptly stops moving. As with the trajectory of FIG. 3, the abrupt stop is depicted in FIG. 4 by the object's location remaining constant during the time of period B, which extends from the point A to the point C. During the entire period B, the object remains static (that is, the object's location does not move). Then, at point C, the object resumes motion.

In the "freezing with skip" case of FIG. 3, after the period B, the object immediately jumps from the location C to a new location C'. In contrast, in the "freezing without skip" case of FIG. 4, the object resumes its motion trajectory at the location C. Thus, a difference occurs between the trajectories of FIG. 3 and FIG. 4 at the time associated with the location C.

Another way to conceptualize this difference between FIG. 3 and FIG. 4 is provided. In this conceptualization, a difference exists between the "freezing with skip" scenario of FIG. 3 and the "freezing without skip" scenario of FIG. 4 in the period B. In the "freezing with skip" case of FIG. 3, the observed object can be considered to actually keep moving even though its activity cannot be observed by the viewer during the entire period B due to certain problems (for example, dropped pictures). Then at point C, when the problem is solved (because, for example, a time period for the dropped pictures is over), the viewer observes that the object immediately jumps from location C to a new location C'. In this conceptualization, the object jumps to the new location C' and is, therefore, presumed to have been traveling toward that new location C' during the period B. In contrast, in the "freezing without skip" case of FIG. 4, the observed object actually remains static during the period B (as is being observed by the viewer) and what the viewer observes is, therefore, the truth.

When "freezing with skip" occurs, as discussed briefly earlier, generally three different types of distortion are observed by a viewer. We discuss each of these below.

First, at the point A, the human brains still tries to follow the movement trajectory that existed prior to the point A, and the human eye notices that the object becomes static at and after the point A. Therefore, the human brain is receiving inconsistent input from its own extension of the movement trajectory, and from the eye's signaling that a movement stop occurred. To resolve the inconsistency, the human brain expends more energy to synchronize the human brain and the human eye. This effect is caused by the human visual system ("HVS") and is typically referred to as a "jerky" (or "jerk")

effect. The jerky effect is typically very annoying when it is combined, but not terribly annoying or obvious for a single occurrence.

As should be clear from the above discussion, a "jerky" effect is related to the jerk, or stop, in motion that occurs when a picture is initially repeated (that is, when a freeze first occurs). A jerk occurs with a freeze, and so is seen with both a "freeze with skip" and a "freeze without skip". The jerky effect arises because the human brain attempts to follow a moving trajectory of a sequence of pictures. However, the sequence of pictures freezes, and the trajectory is artificially and unexpectedly stopped. This unexpected stop is referred to as a jerk in motion, and the human brain expends energy noticing and processing the jerk in motion. The expenditure of energy and the associated processing typically registers as an undesirable aspect of viewing a sequence of pictures. Accordingly, a jerk in motion is considered to be a distortion and to decrease the quality of the sequence of pictures.

Second, during the period B, the viewer observes that the object stops moving. This effect is typically referred to as a "pause" (or "pausing") effect.

Third, at point C, the viewer observes that the object jumps to a different position immediately. This effect is typically referred to as a "jumping" (or "jump") effect. As should be clear from the above discussion, a "jumping" effect is related to the jump in motion that occurs when the content of a picture jumps to a different position in an immediately subsequent picture. This occurs, for example, during a "skip" when the picture after the freeze is displayed. Typically, the dropped pictures exhibit motion with respect to the previously displayed picture (the picture prior to the frozen picture) and with respect to each other. Thus, if no pictures were dropped, there would be a motion trajectory across the dropped pictures to the picture occurring after the dropped pictures. However, when a freeze occurs, the picture immediately following the dropped pictures will exhibit the cumulative motion from all of the dropped pictures. This cumulative motion will typically be experienced as a jump in motion.

When "freezing without skip" occurs, typically only two of the above distortion effects are observed by a viewer. These are the "jerky" effect, and the "pause" effect. In contrast to the "freezing with skip" case of FIG. 3, there is no "jumping" effect observed at point C in FIG. 4.

The inventors have determined that the "freezing with skip" event and the "freezing without skip" event are the "causes" of the video degradation and the resulting distortion perceived by a viewer. Further, the inventors have determined that the jerk, the pause, and the jump are the "effects" (of the "freezing with skip" and "freezing without skip" events) that the viewer actually perceives as distortions.

Common solutions typically use a "cause"-based framework. In a cause-based framework, the distortion is typically evaluated for every occurrence of "freezing with skip" or "freezing without skip".

However, the inventors have determined that, for at least a variety of different applications and environments, an "effect"-based framework is a more reasonable solution and is expected to provide better results. Accordingly, in at least one implementation in this application, an effect-based framework for determining quality and/or distortion is provided. Some further comments on this determination are provided below.

First, a viewer appears to recognize an "effect", rather than a "cause". Normal viewers do not appear to understand the "cause" of the phenomenon that the viewers observe. The viewers usually will find that the video is affected by, for example, "jerks that are too frequent", "pauses that are too long", or "too many jumps". The human brain will naturally gather the information related to a particular type of effect. Thus, viewers will typically collect the information separately for each particular type of effect in identifying a quality perception. Therefore, for example, after having collected the information, a viewer might express a quality perception in terms of a cumulative assessment of one or more types of effects. This is seen, for example, by the phrases "jerks that are too frequent", "pauses that are too long", and "too many jumps". Each of these phrases reflects a perception based on combining (also broadly referred to as accumulating) information for multiple occurrences of a particular type of effect.

Second, different "causes" will often introduce the same kinds of "effects". For example, both "freezing with skip" and "freezing without skip" causes will introduce "pause" effects. When these "causes" appear in the same video sequence, the "effects" introduced by the different "causes" are mixed together and cannot be identified by viewers. Thus, for example, a viewer typically does not separate in his/her mind the "pauses" (for example) that arise from "freezes without skips" and the "pauses" that arise from "freezes with skips". Therefore, in such a situation, it is more generally more useful to focus on the "effects" than the "causes".

Third, a typical "effect" will occur more than one time. Multiple occurrences of the effect would typically be combined using a "pooling strategy" to estimate a viewer's perception that considers all of the occurrences of the "effect". The inventors have determined, however, that different "effects" call for different pooling strategies. To achieve this purpose, an "effect" based framework is used.

2. Evaluating Distortion/Quality

In this application, we propose various implementations that provide, for example, a video quality evaluation model for "freezing", with or without skip, in a certain window size. As an example of a window size, P.NBAMS is a standards organization that is addressing "Non-intrusive bitstream model for the assessment of performance of video streaming" (in particular, with respect to Study Group 12 Question 1 (SG12/Q14)), and the related standard requires a window size of ten seconds. The model is applied, in various implementations, to a variety of different windows. For example, the model is applied in particular implementations to isolated and disjoint windows of interest, to consecutive windows throughout the video, or to overlapping windows to allow complete granularity in specifying any and all windows of interest.

In typical applications, the window size is chosen as part of a model of the human memory, which models the observed tendency of the human brain to forget things after a period of time. Accordingly, many implementations do not use pooling strategies across larger windows or across multiple windows. Nonetheless, in certain applications, for video longer than the window size, pooling strategies are applied to get the final result. Several implementations extend one or more of the pooling solutions described below, which is described in connection with a window, to multiple windows or to an extended window size. However, another implementation attenuates the contribution from more remote distortion events.

Before entering into the discussion below, we summarize some aspects of the context for at least one implementation described below. In the discussion below, a short video (for example, 10 seconds) is degraded by, for example, one or more occurrences of "freezing with skip" or "freezing without skip". For the "freezing with skip" implementations, there are one or more group droppings in the video. For each group dropping, one or more continuous pictures are dropped and replaced with the last correctly received picture. For the "freezing without skip" implementations, the "freezing without skip" occurrences arise from, for example, one or more group delays due to, for example, buffer underflow. The evaluation model described below is applied, in certain implementations, at a receiver or decoder that has information available about, for example, lost packets, dropped pictures, or buffer underflows. However, various other implementations use the model, or variations of the model, at other points in a typical communications system, as is described later in this application.

3. Effect Based Framework

Figure 5:
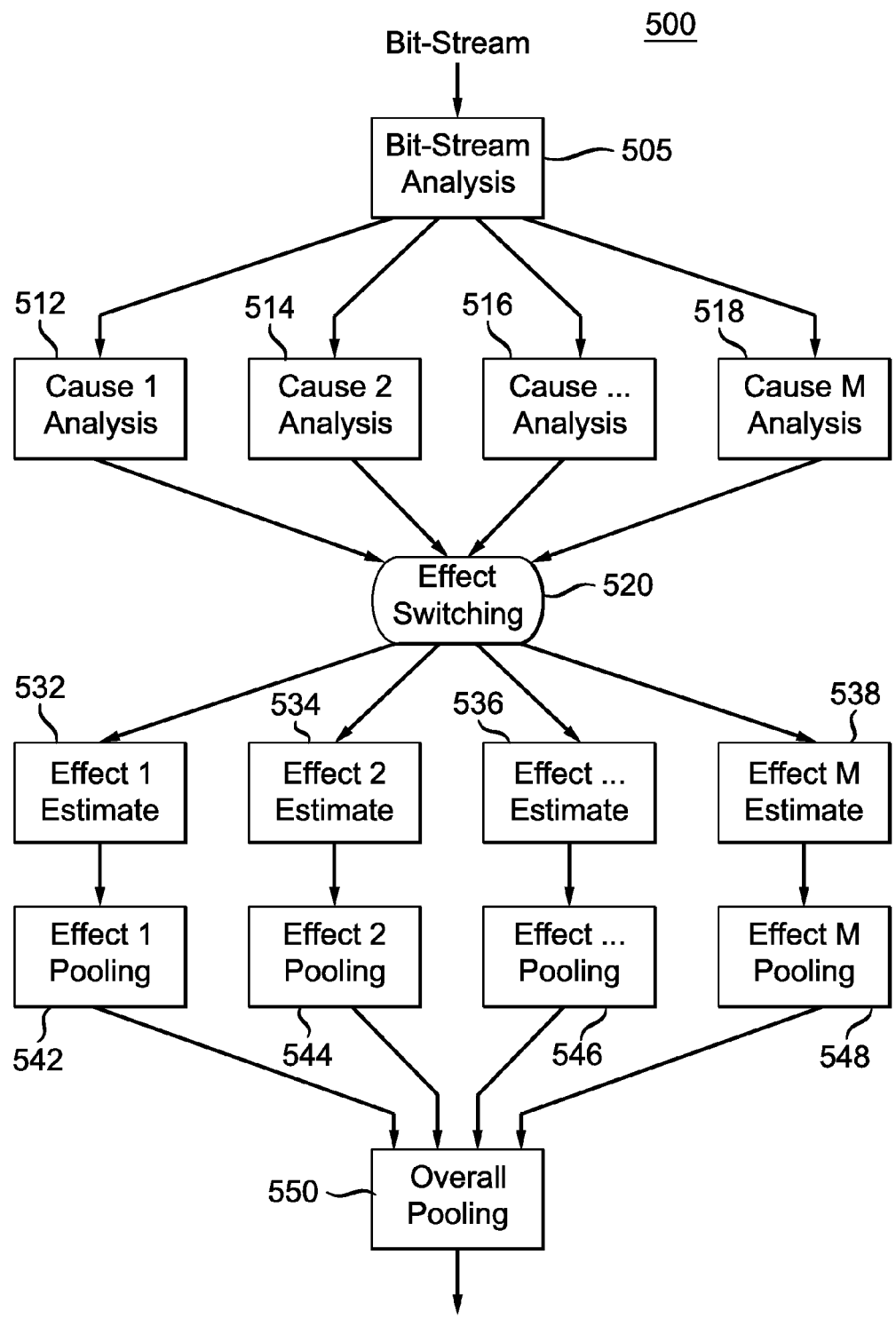
FIG. 5 is a block/flow diagram depicting an implementation of a distortion estimation framework.

Referring to FIG. 5, a framework 500 is provided for an implementation of an effect-based quality evaluation framework. The framework 500 is applicable to, at least, a temporal quality evaluation of a bit-stream layer. The framework 500 is, in various implementations, applied to the pictures of a specific window of pictures, the pictures of a video sequence that includes multiple windows, or to an entire video that includes multiple video sequences. It should also be clear that the blocks of FIG. 5 provide a flow diagram of a process for determining distortion and/or quality, in addition to providing a block diagram of a system or apparatus for determining distortion and/or quality.

At first the input bit-stream passes a Bit-Stream Analysis module 505, in which the bit-stream is analyzed and all the "causes" (such as an occurrence of "freezing with skip", or "freezing without skip") that will possibly introduce distortion are marked out. The bit-stream analysis module 505 is able to identify the causes by, for example, comparing the input bit stream to a template or parameters that are stored at the bit-stream analysis module 505.

In one implementation, the bit-stream analysis module 505 examines the bit stream for a lost packet. A packet is identified as lost, in various implementations, (i) by noticing that a packet count field in a header of packets skips a particular count or does not increment in sequence, (ii) by noticing that packet count problem just mentioned even after time for packets to be received out of order and/or for a request for retransmission to be answered, or (iii) by simply checking a cyclic redundancy check or other error-control measure to determine if a packet is corrupted. Other implementations identify a packet as being lost in a module prior to the bit-stream analysis module 505 and provide such a determination to the bit-stream analysis module 505.

More generally, in various implementations, the input to the bit-stream analysis module 505 is the received bitstream, and the output is an identification of the cause (for example, "cause 1", or "freezing with skip"), and the parameters of the "cause". For "freezing with skip", for example, as a "cause", the parameters of one implementation are the starting point of the freeze, the length of the freeze, and the motion vectors (or motion vector information) that will be used in determining the distortion and/or quality.

In another implementation, a pre-processing module identifies buffer underflows and the length of the underflow, and passes this information at input to the bit-stream analysis module 505. The bit-stream analysis module 505 then identifies that a "freezing without skip" has occurred by comparing the input information to a template for "freezing without skip". After such identification, the bit-stream analysis module 505 provides an output that includes the identification that a "freezing without skip" has occurred, along with parameters that include the starting point of the freeze, the length of the freeze, and the motion vectors (or motion vector information) that will be used in determining the distortion and/or quality.

Each "cause" that is identified by the bit-stream analysis module 505 is sent to a cause analysis module for that particular cause. FIG. 5 shows four cause analysis modules, including a cause 1 analysis module 512 for a first cause, a cause 2 analysis module 514 for a second cause, a placeholder cause analysis module 516 indicating that there may be numerous other causes for any given application or implementation, and a cause M analysis module 518 for the last cause (the Mth cause) for any given application or implementation.

The bit-stream analysis module 505 can send various different information to a cause analysis module. In one particular implementation, cause 1 is "freezing with skip" and the cause 1 analysis module 512 receives information allowing the cause 1 analysis module to identify the pictures that are being skipped. In various such implementations, the received information includes, for example, (i) a list of skipped pictures, (ii) an indication of the first skipped picture and the length of the freeze, or (iii) an indication of the first skipped picture and the last skipped picture.

In the particular implementation, cause 2 is "freezing without skip". Accordingly, the cause 2 analysis module 514 receives information allowing the cause 2 analysis module to identify the length of the freeze. In various implementations, the received information includes, for example, an indication of the picture that should be frozen, and an indication of the amount of time that the picture should be frozen. In other implementations, the picture to be frozen is implicitly determined as the last correctly received picture, and the received information includes, for example, only the indication of the amount of time that the picture should be frozen.

In the implementation of FIG. 5, the cause analysis modules 512-518 provide all the possible "effects" that will be introduced by the respective causes. These "effects" are provided to an effect switching module 520. In typical implementations, this involves the cause analysis modules 512-518 performing at least two functions. The first function is to determine the effects that will be introduced by the cause. The second function is to provide information describing these effects so that the distortion and/or quality of the effect can be determined.

The first function is performed, in at least some implementations, by referencing a list of effects that are associated with a given cause. For many cause analysis modules, the list will typically remain static. For example, in the particular implementation above for which cause 1 is "freezing with skip", the cause 1 analysis module 512 maintains a list of the three effects that typically result from a "freezing with skip". These three effects are a jerky effect, a pause effect, and a jumping effect. Additionally, in the particular implementation above for which cause 2 is "freezing without skip", the cause 2 analysis module 514 maintains a list of the two effects that typically result from a "freezing without skip". These two effects are a jerky effect and a pause effect.

The second function is performed, in at least some implementations, by providing a set of parameters describing the effect. For example, in the particular implementation above for which cause 1 is "freezing with skip", the cause 1 analysis module 512 provides as an output information allowing distortion and/or quality of a jerky effect, a pause effect, and a jumping effect to be determined. Additionally, in the particular implementation above for which cause 2 is "freezing without skip", the cause 2 analysis module 514 provides as an output information allowing distortion and/or quality of a jerky effect and a jumping effect to be determined.

The effect switching module 520 receives the effect information from the various cause analysis modules 512-518. The effect switching module 520 then directs the effect information to an a corresponding effect estimation module that determines the distortion and/or quality for that effect. FIG. 5 shows an effect 1 estimation module 532 for a first effect, an effect 2 estimation module 534 for a second effect, a placeholder effect estimation module 536 indicating that there may be numerous other effects for any given application or implementation, and an effect M estimation module 538 for the last effect. This last effect is referred to generically as an Mth effect, but the "M" of module 538 is in general a different number from the "M" of module 518, because the number of causes is not, in general, the same as the number of effects.

Consider again the particular implementation discussed above for which cause 1 is "freezing with skip" and cause 2 is "freezing without skip". In this particular implementation, effect 1 is a jerky effect, effect 2 is a pause effect, and effect 3 is a jumping effect.

Thus, the effect switching module 520 sends the jerky effect information from the cause 1 analysis module 512 and the cause 2 analysis module 514 (as well as from all other cause analysis modules) to the effect 1 estimation module 532. The effect 1 estimation module then determines (for example, by estimating) the distortion and/or quality for each occurrence of the jerky effect, whether attributable to, for example, a "freezing with skip" or a "freezing without skip".

Similarly, the effect switching module 520 sends the pause effect information from the cause 1 analysis module 512 and the cause 2 analysis module 514 (as well as from all other cause analysis modules) to the effect 2 estimation module 534. The effect 2 estimation module 534 then determines (for example, by estimating) the distortion and/or quality for each occurrence of the pause effect, whether attributable to, for example, a "freezing with skip" or a "freezing without skip".

Similarly, the effect switching module 520 sends the jumping effect information from the cause 1 analysis module 512 and the cause 2 analysis module 514 (as well as from all other cause analysis modules) to the effect M estimation module 538 (assumed to be a jumping effect estimation module). The effect M estimation module 538 then determines (for example, by estimating) the distortion and/or quality for each occurrence of the jumping effect, whether attributable to, for example, a "freezing with skip" or some other cause.

In at least one implementation, the effect estimation modules 532-538 normalize the distortion level for every type of "effect" to be within the range of [0, 1], which allows that the distortion has a value between zero and one, inclusive of the endpoints. In this range, a zero is the lowest distortion level (highest quality level), and a one is the highest distortion level (lowest quality level).

The various effect estimation modules 532-538 provide distortion information to corresponding effect pooling modules. FIG. 5 includes an effect 1 pooling module 542 that receives distortion information from the effect 1 estimation module 532. FIG. 5 includes an effect 2 pooling module 544 that receives distortion information from the effect 2 estimation module 534. FIG. 5 includes a placeholder effect pooling module 546 that receives distortion information from the placeholder effect estimation module 536, indicating that there may be numerous other effects for any given application or implementation. FIG. 5 includes an effect M pooling module 548 that receives distortion information from the effect M estimation module 538. The distortion information provided to the effect pooling modules 542-548 includes, in various implementations, distortion values and/or quality values.

The effect pooling modules 542-548 gather together all the occurrences of a same type of "effect" to provide an overall distortion (or quality) level. Typically, it is the objective of the effect pooling modules 542-548 to estimate a viewer's perception (either a perception of distortion or a perception of quality) after the viewer observes all the occurrences of a given type of "effect". Accordingly, a given effect pooling module from the effect pooling modules 542-548 receives as input the distortion level of every occurrence of the given type of "effect". In at least one implementation, the overall distortion level of a certain type of "effect" is also normalized to the range of [0, 1].

The overall distortion level for each type of effect is provided by the effect pooling modules 542-548 to an overall pooling module 550. The overall pooling module 550 uses a pooling strategy to combine all of the different types of "effect" into an overall distortion level of the video. The pooling strategy used by the overall pooling module 550 may be different from, or the same as, a pooling strategy used by one or more of the effect pooling strategies 542-548. In at least one implementation, the overall pooling module 550 normalizes the overall distortion level of the video to the range of [0, 1].

The framework 500 is applied on a window-by-window basis in one or more implementations, as mentioned earlier. In one such implementation, the effect pooling modules 542-548 serve as the gatekeeper for separating the windows. The effect pooling modules 542-548 use information indicating the window size to determine the time periods for which to pool the distortion for the various effects. The effect pooling modules 542-548 then provide the overall pooling module 550 the pooled distortion values for each successive window in the video. Thus, the overall pooling module 550 pools window-based distortion values for the respective effects, and provides an overall pooled distortion value for each successive window in the video.

In the above window-by-window implementation, the information indicating the window size is provided to the effect pooling modules 542-548 by different mechanisms in various implementations. For example, in various implementations, the information is (i) built into the effect pooling modules 542-548 as a non-variable constant, (ii) supplied to the effect pooling modules during system configuration using a user interface, or (iii) supplied in the bit-stream.

FIG. 5 thus applies generally to any "cause" of distortion, and any corresponding "effects" that give rise to distortion. We now consider more specifically two "causes" and the corresponding effects.

4. An Implementation of the Framework

In at least one implementation, the framework 500 is applied to a system that experiences the temporal abnormalities of "freezing with skip" and "freezing without skip". According to the analysis provided earlier, "freezing with skip" and "freezing without skip" are the two "causes". "Freezing with skip" will introduce three types of "effects", which are "jerky", "pause", and "jumping". "Freezing without skip" will introduce two types of "effects", which are "jerky" and "pause".

Applying the framework 500, the bit-stream analysis module 505 identifies each occurrence of "freezing with skip" and "freezing without skip", and provides appropriate information to the corresponding cause analysis modules. The cause analysis module for "freezing with skip" (for example, the cause 1 analysis module 512) determines that each "freezing with skip" cause introduces one "jerky" effect, one "pause" effect, and one "jumping" effect. The cause analysis module for "freezing without skip" (for example, the cause 2 analysis module 514) determines that each "freezing without skip" cause introduces one "jerky" effect and one "pause" effect. The cause analysis modules provide the "effect" information to the effect switching module 520, and the effect switching module 520 provides the effect information to the corresponding effect estimation module.

Further application of the framework 500 applies several algorithms, or possibly sets of algorithms. A first set of algorithms is applied by the distortion estimation modules 532-538 to determine the distortion or quality for a given occurrence of a given effect. Each effect has a different distortion determination algorithm in at least one implementation, and has the same distortion determination algorithm in another implementation.

A second set of algorithms is applied by the effect pooling modules 542-548 to accumulate the individual distortions for each given effect. Each effect has a different distortion pooling algorithm in at least one implementation, and has the same distortion pooling algorithm in another implementation.

A third algorithm is applied by the overall pooling module 550 to accumulate the pooled distortion values from the various effects, as supplied by the different effect pooling modules 542-548. A single algorithm is used in at least one implementation, and multiple algorithms are used in another implementation.

We further discuss these three areas below. We provide (i) a discussion of the distortion level estimation for "jerky" effects, "pause" effects, and "jumping" effects, (ii) a discussion of the distortion pooling strategy for each of "jerky" effects, "pause" effects, and "jumping" effects, and (iii) an overall pooling strategy for combining the pooled distortion for these three effects.

4.1 Effect Estimation

Figure 6:
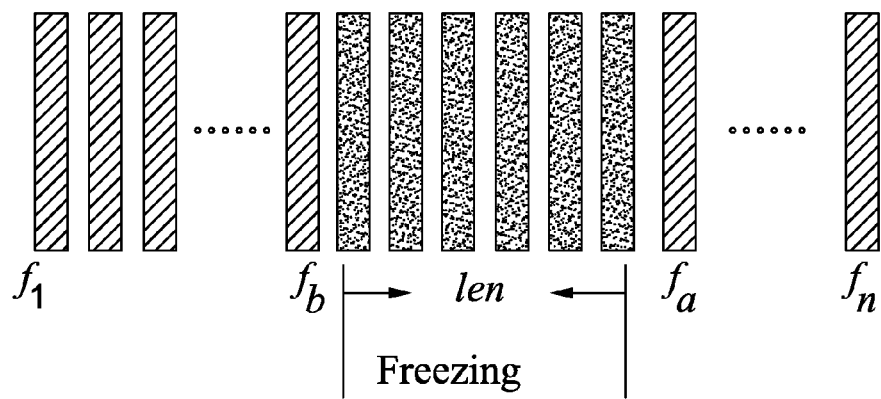
FIG. 6 is a pictorial representation of a example of a video sequence experiencing a freeze.

Referring to FIG. 6, there is shown a video sequence $V=\{f_1, f_2, \ldots, f_n\}$, in which n is the number of pictures in the video sequence, and $f_n$ is the video picture for picture number n. In FIG. 6, a "freezing" is also illustrated. The "freezing" occurs, for example, from either a "freezing with skip" or a "freezing without skip". The freezing is shown as occurring during a group of six pictures marked with a dotted fill pattern. The length of the freezing is indicated by the term len.

The term len is the length of the freeze (for example, the length of the group dropping), expressed in this implementation as the time period of the group dropping, in seconds or some other unit of time, where the time period is the length of time that the non-displayed pictures would have been displayed. In another implementation, the term len is denoted in units of pictures.

In FIG. 6, there is a shown a picture $f_b$, which is the last correctly displayed picture before the freeze (the subscript "b" stands for "before"). That is, the picture that gets frozen is $f_b$. In FIG. 6, there is also shown a picture $f_a$, which is the first correctly displayed picture after the freeze (the subscript "a" stands for "after"). Although the frozen picture is the picture $f_b$, it should be clear that the period referred to as the "freezing" does not include the initial display of the picture $f_b$, (shown with a cross-hatched fill pattern). Rather, the "freezing" refers to the period that occurs after the proper display of the picture $f_b$, during which the picture $f_b$ remains in the display during display times that should have displayed subsequent pictures.

The distortions of the jerky effect, the pause effect, and the jumping effect can be evaluated based on the nomenclature of FIG. 6. Equations for at least one implementation follow.

The distortion level of a jerky effect is designated as $d^{jerky}$. In one implementation, the jerky effect distortion is mainly defined by the movement level at the picture $f_b$. Accordingly, for this implementation we define the jerky effect distortion for a single freezing as:

$$d^{jerky} = mv(f_b)/M$$

In the above equation, $mv(f_b)$ is the average motion vector among all macro-blocks of the picture $f_b$ having a non-zero motion vector. M is a constant defined as the maximum value of the motion vectors. The constant M is used in order to normalize the value of $d^{jerky}$ into the range [0, 1].

In one implementation, normalization is based on the fact that mv will normally not be larger than 32. Accordingly, in that implementation, normalization is achieved by dividing mv by 64, and if the result is larger than 1 then the normalized mv is set to 1.

Referring again to the framework 500, in one implementation, the effect estimation module for the jerky effect (for example, the effect 1 estimation module 532) applies the above equation for $d^{jerky}$. In variations of this implementation, the jerky effect estimation module is provided access to motion vector information as follows:

In one variation, the decoded motion vector information for the picture $f_b$, and the maximum value M, are provided to the jerky effect estimation module. This data is provided using, for example, a table or a pointer to a table. The table, or pointer, are provided, for example, through the cause analysis modules 512-518, and the effect switching module 520, to the effect estimation modules 532-538.

In another variation, the average motion vector value is provided as metadata so that no decoding of the picture data is needed. Further, the maximum value M is set during a system setup procedure, or also provided as metadata. The metadata is provided, for example, through the cause analysis modules 512-518, and the effect switching module 520, to the effect estimation modules 532-538.

The distortion level of a pause effect is designated as $d^{pause}$. In one implementation, the pause effect distortion is mainly dependent on the length of the "pause", which is identified by the term n. As with the discussion above for $d^{jerky}$, the term len identifies the period during which the picture display is paused (that is, frozen) with the picture $f_b$. In several implementations, the distortion level of the "pause" effect has a minimum value of zero when len=0, and has a maximum value of one when len=+∞. Accordingly, for these implementations we define the pause effect distortion for a single freezing as:

$$d^{pause} = \frac{len}{len + c_1}$$

In the above equation, $c_1$ is a constant. The distortion is going to be closer to one if "len" is large, and closer to zero if "len" is small. The constant $c_1$ adjusts the influence of "len", providing distortion values that are closer to one if $c_1$ is small, and closer to zero if $c_1$ is large. In one implementation, the value of $c_1$ is set to one. The constant $c_1$ is set, in various implementations, to apply, for example, to all viewers or to a single viewer. For example, an impatient viewer (or a targeted viewing audience that is expected to be impatient) that only tolerates short "pause" effects is provided, in one implementation, with a different value of $c_1$ than a more patient viewer (or a targeted audience that is expected to be more patient) that tolerates longer "pause" effects.

Referring again to the framework 500, in one implementation, the effect estimation module for the pause effect (for example, the effect 2 estimation module 534) applies the above equation for $d^{pause}$. In variations of this implementation, the pause effect estimation module is provided access to len and $c_1$ as follows:

- In one variation, the length of the pause is determined by the bit-stream analysis module 505, and is provided using, for example, a table or a pointer to a table. The table, or pointer, are provided, for example, through the cause analysis modules 512-518, and the effect switching module 520, to the effect estimation modules 532-538. The bit-stream analysis module 505 determines the length of the pause, or is supplied this information by a decoder or parser.
- In various implementations, the value of $c_1$ is (i) fixed ahead of time and does not need to be communicated to the receiver, (ii) set during system configuration by a user at the receiver, or (iii) determined at the transmission side and sent as metadata requiring decoding of the metadata at the receiver. The metadata is decoded, for example, by the bit-stream analysis module 505, and provided, for example, through the cause analysis modules 512-518, and the effect switching module 520, to the effect estimation modules 532-538.

The distortion level of a jumping effect is designated as $d^{jumping}$. The jumping effect distortion can be modeled as being related to the difference between the picture $f_b$ and the picture $f_a$. Accordingly, in various implementations, the distortion level of the "jumping" effect is directly defined by the difference between the picture $f_b$ and the picture $f_a$. Such a difference is determined, for example, and in various implementations, as either a pixel-wise intensity difference or an average pixel displacing distance.

In one implementation, the pixel-wise intensity difference is calculated as the average of the absolute value of pixel-wise differences of intensity for every pixel location in the two pictures. This is expressed as follows in at least one implementation:

$$\text{Pixel-wise intensity difference} = \frac{\sum_{y=1}^{H}\sum_{x=1}^{W}|f_a(x,y) - f_{a-1}(x,y)|}{W \times H}$$

Where:
- W—the width of the picture,
- H—the height of the picture,
- f(x, y)—the intensity of the pixel at position (x, y) of picture f,
- $f_a$—the picture after the pause, and
- $f_{a-1}$—the picture prior to the picture $f_a$, which is the picture $f_b$ that is frozen, and is also the last correctly received picture.

In one implementation, the average pixel displacing distance can be calculated as the average movement of the pixels in the picture $f_a$ with respect to the picture $f_b$. This is expressed as follows in at least one implementation:

$$\text{Average displacing distance} = \frac{\sum_{y=1}^{H}\sum_{x=1}^{W}\text{Mag}(MV(x,y))}{W \times H} \times \text{coh}(MV(f_a))$$

Where:
- MV(x, y)—the movement at position (x, y) of the picture $f_a$.

Note that MV may be represented by, for example, either a motion vector with respect to $f_b$, or by an optical flow calculation with respect to $f_b$.

Also note that MV(x, y) is a vector with a magnitude and an angle.

Mag(MV(x,y))—the magnitude of the vector MV(x,y).

coh(MV($f_a$))—a normalized value to indicate the level of coherence of the MV values in picture $f_a$. This normalized value will be important because a coherent movement will be more impressive than noise-like movements when jumping occurs. That is, for a coherent movement, the jump will be perceived as being larger. For example, noise like movements may result in all pixels having motion vectors with a large magnitude. However, a picture in which all motion vectors have the same direction will, through the coherence term, generally result in that picture having a higher average displacing distance than the picture with the noise-like movements.

In general terms, coh(MV($f_a$)) is determined by multiplying two factors: a direction coherence, and a magnitude coherence. Each sub-coherence (direction coherence and magnitude coherence) can be estimated by methods such as std, which is discussed further below, or estimated by the entropy of histogram bins as is known in the art. Generally speaking, when the motions over the picture are in the same direction, and are of same speed, the motions have a higher coherence.

However, we also consider implementations that operate at the bit-stream layer without full decoding. Such implementations generally are not able to estimate pixel-wise intensity or average pixel displacing distance. Accordingly, various bit-stream layer implementations define the jumping effect distortion for a single freezing as:

$$d^{jumping} = mv(f_a)/M$$

In the above equation, mv($f_a$) and M are as defined earlier. Additionally, the motion information and the value of M can be provided to the jumping effect estimation module(s) (for example, the effect M estimation module 538) in the same manner as the information is supplied to jerky effect estimation module(s) discussed earlier.

4.2 Effect Pooling

As discussed earlier, each type of "effect" may occur more than one time in, for example, a window or a video sequence. A pooling strategy is used to collect, for example, all of the occurrences of a type of "effect" in a window of interest, and to generate an overall distortion level estimation for that "effect" in the window of interest.

The inventors have determined that, in many applications, a "jerky" effect is highly influenced by the occurrence rate. For example, a viewer typically will barely notice the jerky effect if the jerky effect occurs only a single time or even several times. However, if the jerky effect occurs frequently, and in particular if the jerky effect occurs in a periodic manner, the viewer typically will quickly recognize the jerky effect and feel fatigue from the jerky effect. Accordingly, in one or more implementations, the pooling strategy for accumulating the distortions of jerky effects is defined as:

$$D^{jerky} = (\overline{d_i^{jerky}})^p$$

Where:

$\overline{d_i^{jerky}}$ is the average value of $d_i^{jerky}$ for all the occurrences of the "jerky" effect in, for example, the window of interest. $\overline{d_i^{jerky}}$ is expressed, in at least one implementation, as follows:

$$\overline{d_i^{jerky}} = 1/N \Sigma_i d_i^{jerky}$$

p is a variable that indicates the periodic property of all the occurrences of the "jerky" effect in, for example, the window of interest.

As just noted, p indicates the periodic property of the occurrences of the jerky effect. More specifically, in a general sense, as the jerky effects become more periodic, then we want the pooled distortion estimate to increase. Because the individual distortion estimates are in the range [0, 1], we therefore want p to decrease in order for the pooled distortion estimate to increase. This is achieved with the following formulation of p which is used in various implementations:

$$p = \frac{std}{k \times N_0}$$

Where:
k is the total number of occurrences of the "jerky" effect (within, for example, the observed window, which is, for example, a ten second long video sequence). So, for example, if there are 7 "freeze" causes (including both "freeze with skip", and "freeze without skip") in the window, then is "k"=7.

$$std = \sqrt{dev}.$$

dev is the deviance of all the values of distance between two adjacent "jerky" occurrences. Deviance is well known in the art, and is further explained below.

$N_0$ is a constant. In at least one implementation, $N_0$ is selected to be a large enough constant to make sure $$\frac{k \times dev}{N_0}$$

is in the range of [0, 1].

In applying the above to at least one implementation, we determine the distance between every adjacent set of jerky effects. The distance is defined as the distance between the beginning of the freezes, and that distance is expressed, for example, in units of time or units of number of pictures.

Both dev and std are measurements of the stability of the data series. Regarding our case, the elements of the data series are the distances between adjacent "jerky" effects. For a data series $(x_1, x_2, \ldots, x_n)$:

the average value is $$\overline{x} = \frac{\sum_{i=1}^{n} x_i}{n},$$

the deviance (also known as variance) is $$dev = \frac{\sum_{i=1}^{n} (x - \overline{x})^2}{n-1},$$

and
the standard deviance (also known as standard deviation) is $std = \sqrt{dev}$.

In at least one implementation, $N_0$ is set to the window size expressed in units of time (other implementations express $N_0$ in units of number of pictures). One exception is when k=0, in which case the distortion is set to zero. Otherwise, the minimal value of k is 1 and the maximal value of std is no larger than the window size. Therefore, with $N_0$ set to be the window size, p is guaranteed to be in the range [0,1].

Freezes may extend across window boundaries, and implementations deal with this in various manners. For example, in one implementation, if the freezing extends past a window boundary, or past a specified threshold, the distortion for that "pause" effect is set to a pre-determined value.

Figure 7:
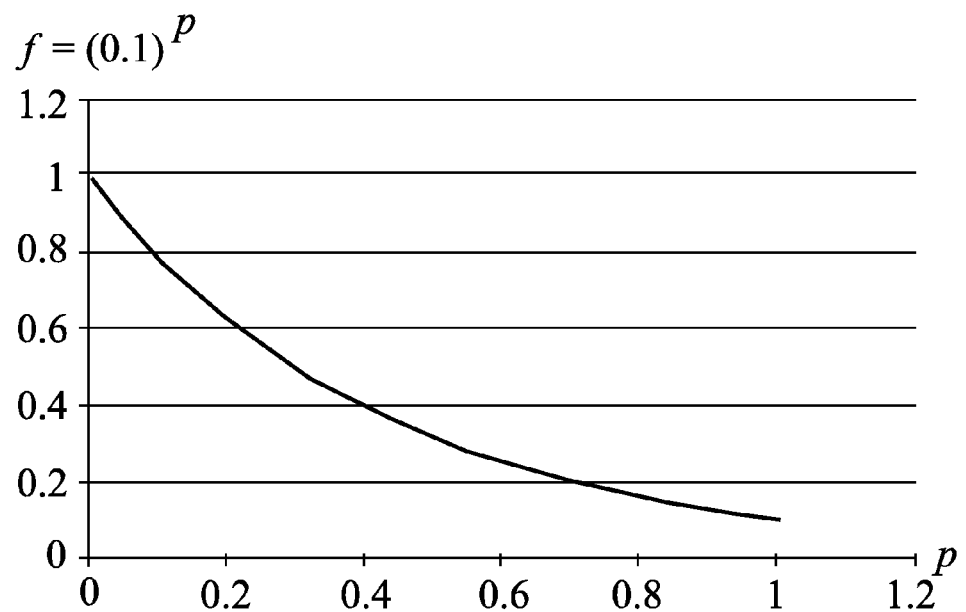
FIG. 7 is a graphical representation of an example of a pooling function.

Referring to FIG. 7, a graph is shown that plots a function of $0.1^p$ (0.1 raised to the power of p), with p between zero and one. We can see that for a given value of $\overline{d_i^{jerky}}$, which is in the range of [0, 1], and the more occurrences there are of the jerky effect, and the lower the deviance of distance between adjacent "jerky" effects, then the lower the value of p will be, and, therefore, the higher the value of $D^{jerky}$ will be.

Pooling the jerky effects typically provides for an increased perception of distortion if the jerky effects are periodic, as explained above. Accumulating multiple occurrences of the pause effect, or the accumulating multiple occurrences of the jumping effect, also results in an increased perception of distortion. That is, more occurrences leads to a much higher distortion level.

However, typically there are differences. These differences justify, at least in part, the use of different kinds of pooling strategies for the different kinds of effects.

Regarding the differences, with the pause effect and the jumping effect, additional occurrences typically produce a dampened perception of incremental distortion, as if the human brain gets used to that particular type of distortive effect. Phrased differently, the rate of increase in the distortion slows down when there are more occurrences of the "pause" effect, or the "jumping" effect. The pooling strategy is then defined, for at least one implementation, as:

$$D^{pause} = \frac{\sqrt{\sum_i d_i^{pause}}}{N}$$

$$D^{jumping} = \frac{\sqrt{\sum_i d_i^{jumping}}}{N}$$

In the above equations, N is a sufficient large constant to ensure that the values of $D^{pause}$ and $D^{jumping}$ remain in the range [0, 1] (other implementations use different ranges, such as, for example, [0, 4] or [1, 5]). In one or more implementations, N is set to the number of pictures in the window of interest, which is 300 for at least one implementation.

The square root function has a number of properties that are suitable to the generally observed data. Two in particular are monotone and suppression. We refer to a pooled distortion as pooling(•), and define monotone and suppression as follows for at least one implementation. The following is expressed in terms of dropped pictures, but applies as well to delayed pictures and "freezing without skip", as well as other causes of non-display of pictures.

1. Monotone—
   Denote $G_1$ and $G_2$ as two group droppings (also referred to as group dropping sets), such that $G_1$ and $G_2$ each include a consecutive set of dropped pictures.
   If $G_2$ is a subset of $G_1$, such that $G_1$ includes all of the dropped pictures of $G_2$, then $pooling(G_1) > pooling(G_2)$.
2. Suppression—
   We note that human viewers typically quickly adjust their judgment rules by their experience from the prior moment. Therefore, a viewer's "dislike" mood will typically be slightly lower when the viewer sees a similar distortion more than one time. That is, after a viewer sees a distortion, when the viewer sees another occurrence of the same or a similar distortion, the viewer does not perceive the additional occurrence as being as large a distortion as the first occurrence.
   Accordingly, if $G_1 \cap G_2 = \emptyset$, such that the two group droppings are completely disjoint, then $pooling(G_1 \cup G_2) < pooling(G_1) + pooling(G_2)$.
   Note that the pooled distortion value is not, in general, a value that can be compared to non-pooled distortion values. This results from the fact that, in certain implementations, the pooled value is normalized to be within the same range (for example, [0, 1]) as the non-pooled values. In such situations, however, pooled values of distortion for different windows, for example, can be compared.
   As a simple example of the application of equation (4), consider the following.
   Assume that:
   $G_1$ and $G_2$ are disjoint (that is, $G_1 \cap G_2 = \emptyset$).
   $G_{1,2} = G_1 \cup G_2$.
   $D(G_1) = 2$, and $D(G_2) = 3$.
   Applying the pooling equation for pause effects or jumping effects yields:
   $pooling(G_1) = sqrt(2/N)$
   $pooling(G_2) = sqrt(3/N)$
   $pooling(G_{1,2}) = sqrt((2+3)/N)$
   It can be seen that:
   $sqrt(5/N) > sqrt(2/N)$ and $sqrt(5/N) > sqrt(3/N)$, thus $pooling(G_{1,2}) > pooling(G_1)$, and $pooling(G_{1,2}) > pooling(G_2)$, and the monotone requirement is met.
   $sqrt(5/N) < sqrt(2/N) + sqrt(3/N)$, thus $pooling(G_1 \cap G_2) < pooling(G_1) + pooling(G_2)$, and the suppression requirement is met.

4.3 Overall Pooling

Referring again to the framework 500, the overall pooling module 550 accumulates the pooled distortion values for the different "effects". The inventors have determined that, in many applications at least, the different kinds of "effects" influence a viewer in a parallel manner. Accordingly, the inventors have determined that for many applications, a linear combination of the different effects will provide a useful overall pooling strategy. This is expressed, for various implementations, as:

"Freezing with skip":

$$D = \alpha_1 \times D^{jerky} + \alpha_2 \times D^{pause} + \alpha_3 \times D^{jumping}$$

Where: $\alpha_1 + \alpha_2 + \alpha_3 = 1$

"Freezing without skip":

$$D = \alpha_1 \times D^{jerky} + \alpha_2 \times D^{pause}$$

Where: $\alpha_1 + \alpha_2 = 1$

The constants $\alpha_1$, $\alpha_2$, and $\alpha_3$ are determined, in various implementations, by training on actual data. An implementation for training is provided below.

Four P.NBAMS training databases are used in the training. The four databases collectively include approximately 200 video sequences that are each approximately ten seconds long. The databases also include a subjective score for each video sequence. The subject score is formed by averaging the subjective scores of approximately 20 people to form a "mean opinion score" (MOS). The MOS is normalized to have a range of [0, 1] that matches the range of the calculated distortion. The framework 500, and the above-described distortion estimation and distortion pooling algorithms are applied to the 200 video sequences using a window size of 300 pictures.

We use the following notations:
We denote the videos in the databases by Dataset={V1, V2, . . . , Vn}, for n up to 200.
We denote the subjective score MOS of the video Vk, for k=1 to 200, by MOS(Vk).
We denote the estimated three kinds of distortions of the video by $D^{jerky}(Vk)$, $D^{pause}(Vk)$, and $D^{jumping}(Vk)$.
The values of $\alpha_1$, $\alpha_2$, and $\alpha_3$ are determined by the below optimization problem:

$$\min \Sigma_{k=1}^{N}(\alpha_1 \times D^{jerky}(V_k) + \alpha_2 \times D^{pause}(V_k) + \alpha_3 \times D^{jumping}(V_k) - MOS)^2$$

The value of $\alpha_1$, $\alpha_2$, and $\alpha_3$ which minimize the above sum of square difference is the trained result. It is a standard process in calculus to solve the above optimization problem, and standard tools can typically provide the result directly.

In one implementation, the above training process produced optimization values that are rounded as follows:

$$\alpha_1 = 0, \alpha_2 = \frac{3.5}{4}, \alpha_3 = \frac{0.5}{4}.$$

These values are suitable for a variety of applications.

Recall that the human brain can react differently to different kinds of effects, as discussed, for example, with respect to jerky effects. The different reactions are related to the operation of the human vision system (HVS) responding to the different kinds of effects. Accordingly, the coefficients can be highly dependent on psychology and physiology. Accordingly, a training approach, as just described, is useful in many applications for which the psychology and physiology are difficult to model.

The coefficients are also dependent in many implementations on the set of video sequences. For this reason, various implementations re-train the coefficients when the set of video sequences changes.

The coefficients are, in many implementations, comparatively independent of the underlying video content. The factor of video content differences is typically captured in the estimation of $D^{jerky}(Vk)$, $D^{pause}(Vk)$, and $D^{jumping}(Vk)$. For example, in one implementation, the content has a lot of motion and so the distortion is high for the jerky effect and for the jumping effect. However, the fact of having a lot of motion does not impact the coefficients in this particular implementation.

We note that in several implementations, the jerky effect in the video sequences of the training databases is not very obvious to a viewer because the occurrences of the jerky effect are not particularly frequent or periodic. In one such implementation, the pooling of the jerky effects will be low (close to zero). Because the pooled distortion value is low, the implementation ignores the influence of the jerky effects and sets the corresponding coefficient to a value of zero.

A variety of implementations have been presented. Additional implementations, however, are possible and envisioned that modify one or more of the parameters. For example, in one or more implementations:

len is expressed in units other than time, such as, for example, the number of consecutive pictures in the group dropping, or the number of pictures divided by the picture rate (for example, the frame rate).

len is used to estimate the distortion for a jumping effect.

Rather than a square root pooling function for the pause effects and the jumping effects, a different function, involving, for example, exponential values, cube roots, other roots, and/or logarithms is used that also satisfies the monotone and suppression requirements.

The normalized values are normalized to a range that is different from [0, 1].

mv is calculated as a mode or median rather than an average, or the average is a weighted average, or only motion vectors of foreground objects are considered, and/or the largest motion vectors are given more weight (a weighted average). More generally, a variety of different filtering algorithms are used in different implementations.

mv is calculated as a combination of one or more motion vectors from multiple pictures. In one implementation, fa and fb (as described earlier) are used.

More specifically, mv is determined, in various implementations, from one or more motion vectors of the picture before the dropped pictures, or from one or more motion vectors of the picture after the dropped pictures, or from a combination of motion vectors of the pictures before and after the dropped pictures. In certain implementations, distortion for a jumping effect is estimated using mv that is based on motion vectors of the picture before the dropped pictures.

FIGS. 8 and 9 provide additional context that is applicable to at least one implementation. Referring to FIG. 8, a video transmission system or apparatus 800 is shown, to which the features and principles described in this application may be applied. The video transmission system or apparatus 800 may be, for example, a head-end or transmission system for transmitting a signal using any of a variety of media, such as, for example, satellite, cable, telephone-line, or terrestrial broadcast. The video transmission system or apparatus 800 also, or alternatively, may be used, for example, to provide a signal for storage. The transmission may be provided over the Internet or some other network. The video transmission system or apparatus 800 is capable of generating and delivering, for example, video content and other content such as, for example, indicators of depth including, for example, depth and/or disparity values. It should also be clear that the blocks of FIG. 8 provide a flow diagram of a video transmission process, in addition to providing a block diagram of a video transmission system or apparatus.

The video transmission system or apparatus 800 receives input video from a processor 801. In one implementation, the processor 801 simply provides video pictures, such as the pictures of the video sequence 100 of FIG. 1, to the video transmission system or apparatus 800. However, in another implementation, the processor 801 alternatively, or additionally, provides depth pictures or other content to the video transmission system or apparatus 800. The processor 801 may also provide metadata to the video transmission system or apparatus 800, in which the metadata relates to one or more of the input pictures.

The video transmission system or apparatus 800 includes an encoder 802 and a transmitter 804 capable of transmitting the encoded signal. The encoder 802 receives video information from the processor 801. The video information may include, for example, video pictures, and/or disparity (or depth) pictures. The encoder 802 generates an encoded signal(s) based on the video and/or disparity information.

In various implementations, the encoder 802 is, for example, an AVC encoder. The AVC encoder may be applied to both video and disparity information. AVC refers to the existing International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "H.264/MPEG-4 AVC Standard" or variations thereof, such as the "AVC standard", the "H.264 standard", or simply "AVC" or "H.264").

The encoder 802 may include sub-modules, including for example an assembly unit for receiving and assembling various pieces of information into a structured format for storage or transmission. The various pieces of information may include, for example, encoded or unencoded video, encoded or unencoded disparity (or depth) values, and encoded or unencoded elements such as, for example, motion vectors, coding mode indicators, and syntax elements. In some implementations, the encoder 802 includes the processor 801 and therefore performs the operations of the processor 801.

The transmitter 804 receives the encoded signal(s) from the encoder 802 and transmits the encoded signal(s) in one or more output signals. The transmitter 804 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using a modulator 806. The transmitter 804 may include, or interface with, an antenna (not shown). Further, implementations of the transmitter 804 may be limited to the modulator 806.

The video transmission system or apparatus 800 is also communicatively coupled to a storage unit 808. In one implementation, the storage unit 808 is coupled to the encoder 802, and the storage unit 808 stores an encoded bitstream from the encoder 802 and, optionally, provides the stored bitstream to the transmitter 804. In another implementation, the storage unit 808 is coupled to the transmitter 804, and stores a bitstream from the transmitter 804. The bitstream from the transmitter 804 may include, for example, one or more encoded bitstreams that have been further processed by the transmitter 804. The storage unit 808 is, in different implementations, one or more of a standard DVD, a Blu-Ray disc, a hard drive, or some other storage device.

Referring now to FIG. 9, a video receiving system or apparatus 900 is shown to which the features and principles described above may be applied. The video receiving system or apparatus 900 may be configured to receive signals over a variety of media, such as, for example, satellite, cable, telephone-line, or terrestrial broadcast. The signals may be received over the Internet or some other network. It should also be clear that the blocks of FIG. 9 provide a flow diagram of a video receiving process, in addition to providing a block diagram of a video receiving system or apparatus.

The video receiving system or apparatus 900 may be, for example, a cell-phone, a computer, a tablet, a set-top box, a television, a gateway, a router, or other device that receives encoded video and provides, for example, decoded video signal for display (display to a user, for example), for processing, or for storage. Thus, the video receiving system or apparatus 900 may provide its output to, for example, a screen of a television, a computer monitor, a computer (for storage, processing, or display), a tablet, or some other storage, processing, or display device.

The video receiving system or apparatus 900 is capable of receiving and processing video information, and the video information may include, for example, video pictures, and/or disparity (or depth) pictures. The video receiving system or apparatus 900 includes a receiver 902 for receiving an encoded signal, such as, for example, the signals described in the implementations of this application. The receiver 902 may receive, for example, a signal providing one or more of the pictures of the video sequence 100 of FIG. 1, or a signal output from the video transmission system 800 (for example, from the storage unit 808 or the transmitter 804) of FIG. 8.

The receiver 902 may be, for example, adapted to receive a program signal having a plurality of bitstreams representing encoded pictures (for example, video pictures or depth pictures). Typical receivers perform functions such as, for example, one or more of receiving a modulated and encoded data signal, demodulating the data signal from one or more carriers using a demodulator 904, de-randomizing the energy in the signal, de-interleaving the data in the signal, and error-correction decoding the signal. The receiver 902 may include, or interface with, an antenna (not shown). Implementations of the receiver 902 may be limited to the demodulator 904.

The video receiving system or apparatus 900 includes a decoder 906. The receiver 902 provides a received signal to the decoder 906. The signal provided to the decoder 906 by the receiver 902 may include one or more encoded bitstreams. The decoder 906 outputs a decoded signal, such as, for example, decoded video signals including video information, or decoded depth signals including depth information. The decoder 906 may be, for example, an AVC decoder.

The video receiving system or apparatus 900 is also communicatively coupled to a storage unit 907. In one implementation, the storage unit 907 is coupled to the receiver 902, and the receiver 902 accesses a bitstream from the storage unit 907 and/or stores a received bitstream to the storage unit 907. In another implementation, the storage unit 907 is coupled to the decoder 906, and the decoder 906 accesses a bitstream from the storage unit 907 and/or stores a decoded bitstream to the storage unit 907. The bitstream accessed from the storage unit 907 includes, in different implementations, one or more encoded bitstreams. The storage unit 907 is, in different implementations, one or more of a standard DVD, a Blu-Ray disc, a hard drive, or some other storage device.

The output video from the decoder 906 is provided, in one implementation, to a processor 908. The processor 908 is, in one implementation, a processor configured for rendering new views. In some implementations, the decoder 906 includes the processor 908 and therefore performs the operations of the processor 908. In other implementations, the processor 908 is part of a downstream device such as, for example, a set-top box, a tablet, or a television. More generally, the processor 908 and/or the video receiving system or apparatus 900 are, in various implementations, part of a gateway, a router, a set-top box, a tablet, a television, or a computer.

Various implementations of the video receiving system or apparatus 900 and/or the processor 908 evaluate distortion and/or quality of a video sequence that includes one or more group droppings (that is, a group of dropped pictures) caused by "freezing with skip". The distortion and/or quality of the group droppings can be determined as described in this application (using, for example, the methods described in FIG. 10 or 11). Various of such implementations, including the methods described below in FIGS. 10 and 11, are performed at, for example, the receiver 902, the demodulator 904, the decoder 906, and/or the processor 908.

Figure 10:
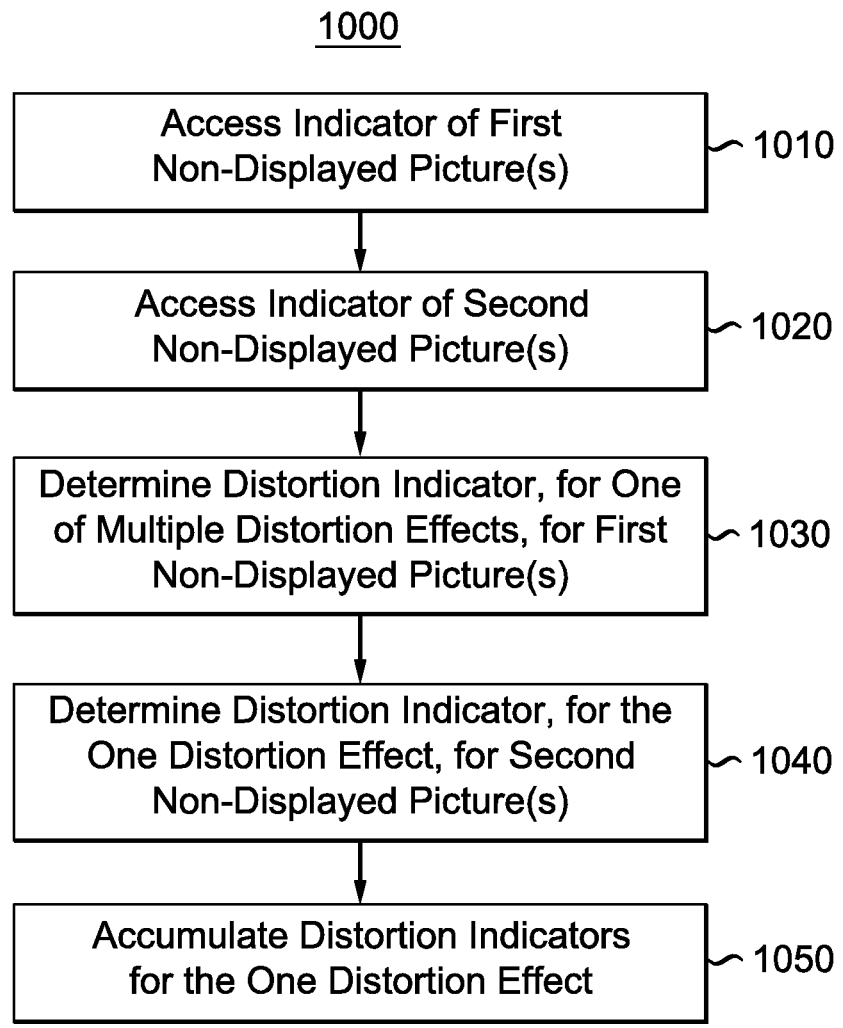
FIG. 10 is a block/flow diagram depicting a first implementation of an apparatus and method for determining distortion and/or quality.
Figure 11:
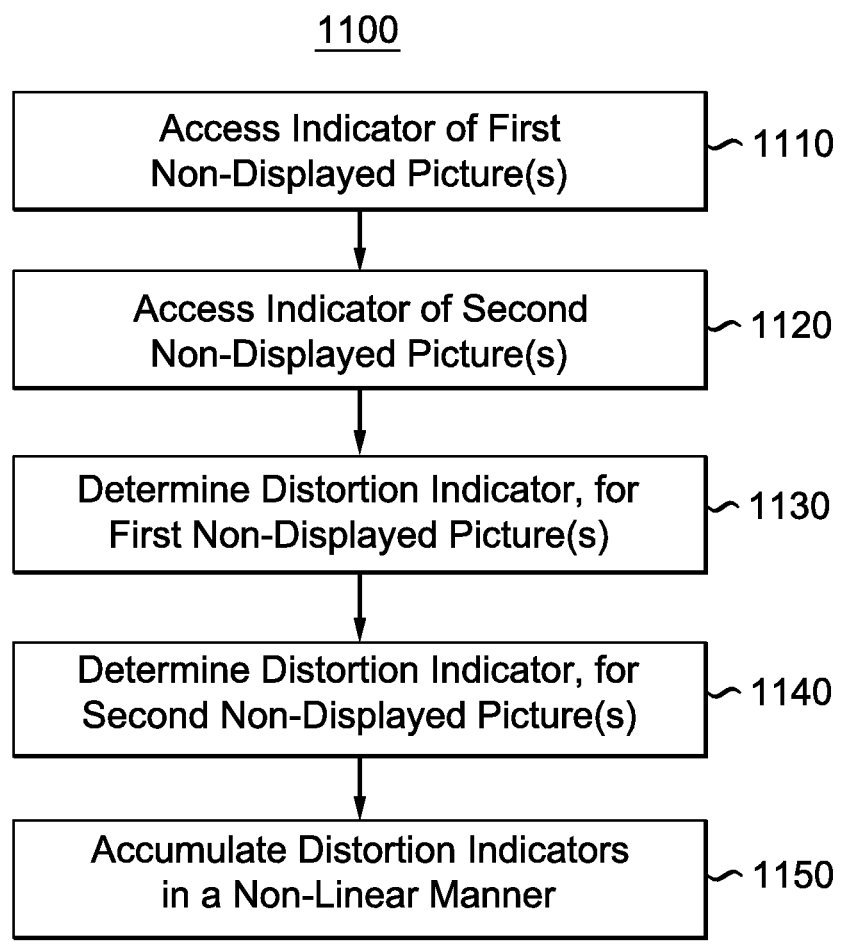
FIG. 11 is a block/flow diagram depicting a second implementation of an apparatus and method for determining distortion and/or quality.

Referring to FIG. 10, a process 1000 is shown for determining distortion and/or quality. It should be clear that the blocks of FIG. 10 provide a block diagram of a system or apparatus for determining distortion and/or quality, in addition to providing a flow diagram of a process for determining distortion and/or quality. The process 1000 includes accessing an indicator of first non-displayed picture(s) (1010). The operation 1010 includes, in at least one implementation, accessing information indicating that a first set of one or more consecutive pictures from a video sequence are not to be displayed. The operation 1010 is performed, in various implementations, by, for example, (i) the bit-stream analysis module 505 accessing information indicating that a packet is lost and that a sequence of pictures will be dropped, (ii) the cause analysis modules 512-518 accessing information indicating that a freeze with skip will occur at a particular location and for a particular duration, and (iii) the effect estimating modules 532-538 accessing information indicating that a particular pause effect, having a specified length, occurred.

The process 1000 includes accessing an indicator of second non-displayed picture(s) (1020). The operation 1020 includes, in at least one implementation, accessing information indicating that a second set of one or more consecutive pictures from the video sequence are not to be displayed. The second set is separate from the first set in the video sequence. Two sets are separate by being disjoint, that is, non-overlapping. Two sets can be separate even though are adjacent to each other. Thus, two successive GOPs are separate from each other even though there are no pictures between the two successive GOPs. The operation 1020 is performed, in various implementations, by, for example, the same examples listed above for the operation 1010.

The process 1000 includes determining a distortion indicator, for one of multiple distortion effects, for the first non-displayed picture(s) (1030). The operation 1030 includes, in at least one implementation determining a first indicator. The first indicator indicates an amount of distortion associated with a given type of distortive effect, from among multiple types of distortive effects, that results from displaying the video sequence with substantially a common first picture displayed during a display time for the first set of pictures. Displaying substantially a common first picture during the display time includes displaying substantially the same (that is, a common) picture during the entire display time. Thus, this includes displaying a last decoded picture during a freeze. However, this also includes displaying pictures during the freeze that change slightly but are still substantially the same. One such change is, for example, adding a count to the last decoded picture that increments with each picture display time during the freeze. The operation 1030 is performed, in various implementations, by, for example, the effect estimating modules 532-538 estimating the distortion caused by, for example, a jerky effect arising from a "freeze with skip" or a "freeze without skip" cause.

The process 1000 includes determining a distortion indicator, for the one distortion effect, for the second non-displayed picture(s) (1040). The operation 1040 includes, in at least one implementation determining a second indicator. The second indicator indicates an amount of distortion associated with the given type of distortive effect that results from displaying the video sequence with substantially a common second picture displayed during a display time for the second set of pictures. Displaying substantially a common second picture during the display time has the same meaning as for the common first picture. However, the first picture is a different picture than the second picture. The operation 1040 is performed, in various implementations, by, for example, the same examples listed above for the operation 1030.

The process 1000 includes accumulating the distortion indicators for the one distortion effect (1050). The operation 1050 includes, in at least one implementation accumulating the first indicator and the second indicator to produce a combined indicator of distortion for the given type of distortive effect. The operation 1050 is performed, in various implementations, by, for example, the effect pooling modules 542-548 pooling the distortion estimates for a given type of effect, such as, for example, a jerky effect, a pause effect, or a jumping effect.

Referring to FIG. 11, a process 1100 is shown for determining distortion and/or quality. It should be clear that the blocks of FIG. 11 provide a block diagram of a system or apparatus for determining distortion and/or quality, in addition to providing a flow diagram of a process for determining distortion and/or quality. The process 1100 includes accessing an indicator of first non-displayed picture(s) (1110). The operation 1110 includes, in at least one implementation, accessing information indicating that a first set of one or more consecutive pictures from a video sequence are not to be displayed. The operation 1110 is performed, in various implementations, by, for example, the same examples listed above for the operations 1010 and 1020.

The process 1100 includes access an indicator of second non-displayed picture(s) (1120). The operation 1120 includes, in at least one implementation, accessing information indicating that a second set of one or more consecutive pictures from the video sequence are not to be displayed. The second set is separate from the first set in the video sequence. The operation 1120 is performed, in various implementations, by, for example, the same examples listed above for the operations 1010, 1020, and 1110.

The process 1100 includes determining a distortion indicator, for the first non-displayed picture(s) (1130). The operation 1130 includes, in at least one implementation, determining a first indicator. The first indicator indicates an amount of distortion across one or more types of distortive effects that result from displaying the video sequence with substantially a common first picture displayed during a display time for the first set of The operation 1120 is performed, in various implementations, by, for example, the same examples listed above for the operations 1010, 1020, and 1110. pictures. The operation 1130 is performed, in various implementations, by, for example, the same examples listed above for the operations 1030 and 1040.

The process 1100 includes determining a distortion indicator, for the second non-displayed picture(s) (1140). The operation 1140 includes, in at least one implementation, determining a second indicator. The second indicator indicates an amount of distortion across the one or more types of distortive effects that result from displaying the video sequence with substantially a common second picture displayed during a display time for the second set of pictures. The operation 1140 is performed, in various implementations, by, for example, the same examples listed above for the operations 1030, 1040, and 1130.

The process 1100 includes accumulating the distortion indicators, for the first non-displayed picture(s) and for the second non-displayed picture(s), in a non-linear manner (1150). The operation 1150 includes, in at least one implementation, accumulating the first indicator and the second indicator in a non-linear manner to produce a combined indicator of distortion. The operation 1150 is performed, in various implementations, by, for example, the effect pooling modules 542-548 pooling the distortion estimates for a given type of effect, such as, for example, a jerky effect, a pause effect, or a jumping effect, using an exponential, square root, or other non-linear pooling algorithm as described earlier.

The processes 1000 and 1100, as well as other implementations described in this application can be performed at a variety of points in a communications system. As discussed above with respect to FIGS. 8-9, determinations of distortion and/or quality are performed, in various implementations, at the decoding/reception/display end of a communication system. Such determinations are, in various implementations, part of a Quality of Experience ("QoE") evaluation. The QoE evaluation is, in various implementations, envisioned to be performed according to a standardized algorithm. The standardized algorithm may be one or more (or a variation of one or more) of the described implementations for evaluating distortion and/or quality.

This application provides multiple block/flow diagrams, including the block/flow diagrams of FIGS. 5 and 8-11. It should be clear that the block/flow diagrams of this application present a variety of information, including, for example, a flow diagram describing a process, and a block diagram describing functional blocks of an apparatus. Additionally, this application provides multiple pictorial representations, including the pictorial representations of FIGS. 1-2 and 6. It should be clear that the pictorial representations of this application present a variety of information, including, for example, an illustration of a result or output, and a flow diagram describing a process. Additionally, this application provides multiple graphical representations, including the graphical representations of FIGS. 3, 4, and 7. It should be clear that the graphical representations of this application present a variety of information, including, for example, an illustration of a result or output for a function at various input values, and an indication of relationships among variables.

Various implementations have been described that determine distortion and/or quality of a group dropping that results in a "freeze with skip". These implementations are extended, in various other implementations, to apply to distortions other than group droppings that result in a "freeze with skip". In particular, the techniques and implementations of this application apply, in various implementations, to distortion resulting only from a freeze, to distortion resulting only from a skip, or to other distortions. Indeed, the pooling techniques described, such as, for example, the algorithms applied by the effect pooling modules 542-548 or the overall pooling module 550, apply in various other implementations to pooling any distortion values, and are not restricted to freezes and/or skips.

Various implementations have been described that apply to video sequences. These implementations are extended, in various other implementations, to apply to other content. Such other content includes, for example, content other than standard two-dimensional video content. Non-video content includes, for example, depth maps, edge maps, transparency maps, ultra-violet or infra-red frequency images, heat signatures from night-vision goggles, scientific data intended to be analyzed on a display, or any data having a repeating pattern or intended to be viewed in a sequential manner.

Various implementations have been described that determine distortion and/or quality of a group dropping that includes one or more dropped pictures. These implementations do not depend on any particular technique for determining when a picture is to be dropped. Implementations need not even include the determination of whether or not a picture is dropped, because the indication that a picture is (or is not) dropped is an input to these implementations. Consequently, the determination to drop a picture may be made in various ways, as is known in the art, and may include, for example, dropping a picture if a single packet of the picture is lost, or dropping a picture only if all packets of the picture are lost and if suitable concealment techniques are not available.

Various implementations have been described that determine distortion and/or quality of a group dropping that includes one or more dropped pictures that result in a "freeze with skip". These implementations are extended in various other implementations to apply to situations in which the "freeze" does not involve repeating the same exact picture during the display time for each dropped picture. For example, in one implementation, a small counter is included in the bottom right of the displayed picture indicating the number of times that the picture has been repeated. Thus, if four pictures were dropped, the "frozen" picture that is displayed for five display times (including the one expected display time, and the four "frozen" display times) would be identical except that a small counter would appear in the bottom right during the four display times for the dropped pictures. This small counter would increment from one, to two, to three, to four, in these four display times.

We have described implementations that drop a picture when a single packet is lost. The picture is dropped due to a single packet loss, in certain implementations, because, for example, (i) in low resolution videos, the whole picture is often in a single packet, or (ii) certain applications have a requirement that there be no concealment artifacts and thus error concealment is not used. Implementations vary in the determination of when to drop a picture (for example, dropping if only a single packet is lost, or requiring more packets to be lost, etc.). However, when the picture is dropped, the freezing with skip distortion occurs. Other applications do attempt error concealment if a single packet is lost. Certain implementations also drop all further pictures that depend on a dropped picture, even if only a single macroblock of one of the further pictures uses the dropped picture as a reference. Such implementations drop these dependent pictures because, for example, (i) there is requirement for no concealment artifacts, (ii) the entire further picture is in a single packet and it is efficient to avoid decoding the packet, or (iii) quality is more assured in this manner because even a single lost macroblock in a dependent picture may have critical content (for example, an object) for viewer satisfaction. Additionally, other implementations vary in the determination of when to drop a subsequent picture that depends from a dropped picture, requiring, for example, a threshold number of macroblocks of the subsequent picture to be affected, or error concealment artifacts to be above a threshold. Note that dropping a picture is also considered, in various implementations, to be a form of error concealment.

We described above implementations that use various different pooling functions. Other pooling functions are possible. Various other implementations use a wrap function for pooling, as follows:

$$D(G) = \frac{\sqrt{\sum_{g \in G} D(g)}}{C1}, \text{ if } D(G) \leq C2$$

$$D(G) = C2, \text{ otherwise}$$

In the above equation, D(G) is the pooled distortion for a set of individual distortions D(g)., where g refers to each individual cause or effect. The above wrap function uses two constant numbers, which are C1 and C2. Both C1 and C2 are determined by experiment in various implementations.

Various implementations may have one or more of a variety of advantages. A partial list of these advantages includes: (i) low complexity, (ii) separation of "freeze" and "skip" distortions in the distortion model, (iii) allowing accurate determination of distortion arising from, for example, freezes, skips, or freeze with skip, (iv) allowing encoding, modulation, and transmission parameters to be determined to provide desired quality levels, and/or (v) pooling distortion/quality values, for multiple occurrences of distortion, in an accurate manner.

We thus provide one or more implementations having particular features and aspects. In particular, we provide several implementations relating to determining distortion and/or quality. However, variations of these implementations and additional applications are contemplated and within our disclosure, and features and aspects of described implementations may be adapted for other implementations.

Several of the implementations and features described in this application may be used in the context of the AVC Standard, and/or AVC with the MVC extension (Annex H), and/or AVC with the SVC extension (Annex G). Additionally, these implementations and features may be used in the context of another standard (existing or future), or in a context that does not involve a standard.

It should be clear that a distortion term or a quality term typically indicates both distortion and quality. Thus, for example, references to D(g) indicate both distortion and quality.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, evaluating the information, predicting the information, or retrieving the information from memory.

Further, this application or its claims may refer to "accessing" various pieces of information. Accessing the information may include one or more of, for example, receiving the information, retrieving the information (for example, memory), storing the information, processing the information, transmitting the information, moving the information, copying the information, erasing the information, calculating the information, determining the information, predicting the information, evaluating the information, or estimating the information.

Various implementations refer to "images" and/or "pictures". The terms "image" and "picture" are used interchangeably throughout this document, and are intended to be broad terms. An "image" or a "picture" may be, for example, all or part of a frame or of a field. The term "video" refers to a sequence of images (or pictures). An image, or a picture, may include, for example, any of various video components or their combinations. Such components, or their combinations, include, for example, luminance, chrominance, Y (of YUV or YCbCr or YPbPr), U (of YUV), V (of YUV), Cb (of YCbCr), Cr (of YCbCr), Pb (of YPbPr), Pr (of YPbPr), red (of RGB), green (of RGB), blue (of RGB), S-Video, and negatives or positives of any of these components. An "image" or a "picture" may also, or alternatively, refer to various different types of content, including, for example, typical two-dimensional video, a disparity map for a 2D video picture, a depth map that corresponds to a 2D video picture, or an edge map.

A "depth map", or "disparity map", or "edge map", or similar terms are also intended to be broad terms. A map generally refers, for example, to a picture that includes a particular type of information. However, a map may include other types of information not indicated by its name. For example, a depth map typically includes depth information, but may also include other information such as, for example, video or edge information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C" and "at least one of A, B, or C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Various implementations refer to "combining", such as, for example, in combining distortion or quality, or combining indicators of distortion or quality. "Combining" is also referred to as accumulating or, in various implementations, pooling. "Combining" is performed, in various implementations, using one or more of, for example, addition operations, multiplication operations, exponential operations, operations that select a minimum, or operations that select a maximum.

Additionally, many implementations may be implemented in one or more of an encoder (for example, the encoder 802), a decoder (for example, the decoder 906), a post-processor (for example, the processor 908) processing output from a decoder, or a pre-processor (for example, the processor 801) providing input to an encoder. The processors discussed in this application do, in various implementations, include multiple processors (sub-processors) that are collectively configured to perform, for example, a process, a function, or an operation. For example, the processor 801 and the processor 908 are each, in various implementations, composed of multiple sub-processors that are collectively configured to perform the operations of the respective processors 801 and 908. Further, other implementations are contemplated by this disclosure.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a set-top box, a gateway, a router, a microprocessor, an integrated circuit, or a programmable logic device. Processors also include communication devices, such as, for example, computers, cell phones, portable/personal digital assistants ("PDAs"), tablets, laptops, and other devices that facilitate communication of information between end-users. A processor may also include multiple processors that are collectively configured to perform, for example, a process, a function, or an operation. The collective configuration and performance may be achieved using any of a variety of techniques known in the art, such as, for example, use of dedicated sub-processors for particular tasks, or use of parallel processing.

Implementations of the various processes and features described herein may be embodied in a variety of different equipment or applications, particularly, for example, equipment or applications associated with data encoding, data decoding, view generation, depth or disparity processing, and other processing of pictures and related depth and/or disparity maps. Examples of such equipment include an encoder, a decoder, a post-processor processing output from a decoder, a pre-processor providing input to an encoder, a video coder, a video decoder, a video codec, a web server, a set-top box, a, a laptop, a personal computer, a tablet, a cell phone, a PDA, and other communication devices. As should be clear, the equipment may be mobile and even installed in a mobile vehicle.

Additionally, the methods may be implemented by instructions being performed by a processor (or by multiple processors collectively configured to perform such instructions), and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a "DVD", often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a standard, or to carry as data the actual syntax-values written for a standard. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
accessing information indicating that a first set of one or more consecutive pictures from a video sequence are not to be displayed;
accessing information indicating that a second set of one or more consecutive pictures from the video sequence are not to be displayed, the second set being separate from the first set in the video sequence;
determining a first indicator, the first indicator indicating an amount of distortion associated with a given type of distortive effect, from among multiple types of distortive effects that result from displaying the video sequence with a same first picture displayed during a display time for the first set of pictures;
determining a second indicator, the second indicator indicating an amount of distortion associated with the given type of distortive effect, from among the multiple types of distortive effects that result from displaying the video sequence with a same second picture displayed during a display time for the second set of pictures; and
combining the first indicator and the second indicator to produce a combined indicator of distortion for the given type of distortive effect.

2. The method of claim 1 further comprising determining an indicator of total distortion across the multiple types of distortive effects based on the combined indicator of distortion for the given type of distortive effect.

3. The method of claim 1 further comprising:
determining a third indicator, the third indicator indicating an amount of distortion associated with an additional type of distortive effect, from among the multiple types of distortive effects that result from displaying the video sequence with the same first picture displayed during the display time for the first set of pictures;
determining a fourth indicator, the fourth indicator indicating an amount of distortion associated with the additional type of distortive effect from among the multiple types of distortive effects that result from displaying the video sequence with the same second picture displayed during the display time for the second set of pictures; and
combining the third indicator and the fourth indicator to produce an additional combined indicator of distortion that indicates distortion for the additional type of distortive effect.

4. The method of claim 3 further comprising determining an indicator of total distortion across the multiple types of distortive effects based on the combined indicator of distortion for the given type of distortive effect and on the additional combined indicator of distortion for the additional type of distortive effect.

5. The method of claim 3, wherein the first indicator and the third indicator are combined in a linear manner to indicate an amount of distortion that results from displaying the video sequence with the same first picture displayed during the display time for the first set of pictures.

6. The method of claim 1 wherein the given type of distortive effect comprises one or more of a jerk effect, a pause effect, or a jump effect.

7. The method of claim 1 further comprising:
determining a third indicator, the third indicator indicating an amount of distortion associated with the given type of distortive effect that results from displaying the video sequence with a third same picture displayed during a display time for a third set of one or more consecutive pictures from the video sequence that are not to be displayed, the third set being separate from both the first set and the second set in the video sequence,
wherein the combining further comprises combining the third indicator with the first and second indicators, and wherein the combining uses a function for the combining that produces a combined indicator of distortion that varies inversely with a deviance between locations of adjacent sets of the first set, the second set, and the third set.

8. The method of claim 7 wherein the function includes an exponent that reflects the deviance.

9. The method of claim 8 wherein the exponent also reflects the number of indicators that are being combined.

10. The method of claim 1 wherein the determining a first indicator, the determining a second indicator and the combining are performed by one or more of a decoder, a demodulator, a receiver, a set-top box, a gateway, a router, a tablet, and a processor.

11. An apparatus comprising:
a bit-stream analysis module configured to:
access information indicating that a first set of one or more consecutive pictures from a video sequence are not to be displayed, and
access information indicating that a second set of one or more consecutive pictures from the video sequence are not to be displayed, the second set being separate from the first set in the video sequence;
an effect estimate module configured to:
determine a first indicator, the first indicator indicating an amount of distortion associated with a given type of distortive effect, from among multiple types of distortive effects that result from displaying the video sequence with a same first picture displayed during a display time for the first set of pictures, and
determine a second indicator, the second indicator indicating an amount of distortion associated with the given type of distortive effect of the multiple types of distortive effects that result from displaying the video sequence with a same second picture displayed during a display time for the second set of pictures; and
an effect pooling module configured to
combine the first indicator and the second indicator to produce a combined indicator of distortion for the given type of distortive effect.

12. The apparatus of claim 11 further comprising an overall pooling module configured to determine an indicator of total distortion across the multiple types of distortive effects based on the combined indicator of distortion for the given type of distortive effect.

13. The apparatus of claim 11 further comprising:
a second effect estimate module configured to:
  determine a third indicator, the third indicator indicating an amount of distortion associated with an additional type of distortive effect, from among the multiple types of distortive effects that result that results from displaying the video sequence with the same first picture displayed during the display time for the first set of pictures, and
  determine a fourth indicator, the fourth indicator indicating an amount of distortion associated with the additional type of distortive effect of the multiple types of distortive effects that result from displaying the video sequence with the same second picture displayed during the display time for the second set of pictures; and
a second effect pooling module configured to
  combine the third indicator and the fourth indicator to produce an additional combined indicator of distortion that indicates distortion for the additional type of distortive effect.

14. The apparatus of claim 13, further comprising an overall pooling module configured to determine an indicator of total distortion across the multiple types of distortive effects based on the combined indicator of distortion for the given type of distortive effect and on the additional combined indicator of distortion for the additional type of distortive effect.

15. The apparatus of claim 13 wherein the first indicator and the third indicator are combined in a linear manner to indicate an amount of distortion from displaying the video sequence with the same first picture displayed during the display time for the first set of pictures.

16. The apparatus of claim 11 wherein the given type of distortive effect comprises one or more of a jerk effect, a pause effect, or a jump effect.

17. The apparatus of any of claim 11 further comprising:
a second effect estimate module configured to
  determine a third indicator, the third indicator indicating an amount of distortion associated with the given type of distortive effect that results from displaying the video sequence with a third same picture displayed during a display time for a third set of one or more consecutive pictures from the video sequence that are not to be displayed, the third set being separate from both the first set and the second set in the video sequence,
wherein the effect pooling module further combines the third indicator with the first and second indicators, using a function that produces a combined indicator of distortion that varies inversely with a deviance between locations of adjacent sets of the first set, the second set, and the third set.

18. The apparatus of claim 17 wherein the function includes an exponent that reflects the deviance.

19. The apparatus of claim 18 wherein the exponent also reflects the number of indicators that are being combined.

20. A non-transitory computer readable medium having stored thereon instructions for causing one or more processors to perform:
  accessing information indicating that a first set of one or more consecutive pictures from a video sequence are not to be displayed;
  accessing information indicating that a second set of one or more consecutive pictures from the video sequence are not to be displayed, the second set being separate from the first set in the video sequence;
  determining a first indicator, the first indicator indicating an amount of distortion associated with a given type of distortive effect, from among multiple types of distortive effects that result from displaying the video sequence with a same first picture displayed during a display time for the first set of pictures;
  determining a second indicator, the second indicator indicating an amount of distortion associated with the given type of distortive effect, from among the multiple types of distortive effects that result from displaying the video sequence with a same second picture displayed during a display time for the second set of pictures; and
  combining the first indicator and the second indicator to produce a combined indicator of distortion for the given type of distortive effect.

* * * * *